(12) United States Patent
Tsui et al.

(10) Patent No.: US 8,273,848 B2
(45) Date of Patent: Sep. 25, 2012

(54) PROTECTIVE POLYMERIC MATERIALS AND RELATED DEVICES

(75) Inventors: Nicholas T. Tsui, Arlington, VA (US); Edwin L. Thomas, Natick, MA (US); Timothy M. Swager, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 79 days.

(21) Appl. No.: 12/529,939

(22) PCT Filed: Mar. 7, 2008

(86) PCT No.: PCT/US2008/003077
§ 371 (c)(1),
(2), (4) Date: Jan. 25, 2010

(87) PCT Pub. No.: WO2008/133776
PCT Pub. Date: Nov. 6, 2008

(65) Prior Publication Data
US 2011/0190457 A1    Aug. 4, 2011

Related U.S. Application Data

(60) Provisional application No. 60/905,512, filed on Mar. 7, 2007.

(51) Int. Cl.
*C08G 64/00* (2006.01)
*C08G 63/02* (2006.01)
(52) U.S. Cl. .................................. 528/196; 528/198
(58) Field of Classification Search .................. 528/196, 528/198
See application file for complete search history.

(56) References Cited

U.S. PATENT DOCUMENTS
2003/0178607 A1    9/2003   Swager et al.

FOREIGN PATENT DOCUMENTS
SU           1 435 598 A1   11/1988

OTHER PUBLICATIONS

Invitation to Pay Additions Fees for PCT/US2008/003077 mailed Dec. 2, 2008.
International Search Report and Written Opinion for PCT/US2008/003077 mailed Jan. 23, 2009.
International Preliminary Report on Patentability for PCT/US2008/003077 mailed Sep. 17, 2009.
Bartlett et al., Triptycenel (9,10-o-Benzenoanthracene). J Am Chem Soc. 1942;64:2649-53.
Boyles et al., Aromatic Copolycarbonates of Bisphenol A and Triptycene-1,4-Hydroquinone. Polymer Preprints. 2007;48(1):352-53.
Kochergin et al., Deformation properties of copolycarbonates prepared from bisphenol A and 2,5-triptycenediol. Plasticheskie Massy. 1986;3:26-8. Russian.
Long et al., Minimization of Free Volume: Alignment of Triptycenes in Liquid Crystals and Stretched Polymers. Adv Mater. 2001;13(8):601-04.
Shogenov et al., Properties of polycarbonate-polycarbonate copolymers. Plasticheskie Massy. 1986;10:59-60. Russian.
Tsui et al., Enhance Polycarbonates for Transparent Ballistic Armor. 4th annual NanoMaterials for Defense Applications Symposium: Accelerating the Transition, May 1-4, 2006 in Virginia Beach, VA. Poster.
Tsui et al., Enhancement to the rate-dependent mechanical behavior of polycarbonate by incorporation of triptycenes. Polymer. 2008;49(21):4703-12.
Tsui et al., Minimization of Internal Molecular Free Volume: A Mechanism for the Simultaneous Enhancement of Polymer Stiffness, Strength, and Ductility. Macromolecules. 2006;39(9):3350-58.

*Primary Examiner* — Terressa Boykin
(74) *Attorney, Agent, or Firm* — Wolf, Greenfield & Sacks, P.C.

(57) ABSTRACT

The present invention relates to polymeric materials having enhanced properties. In some cases, the materials may comprise polymers having shape-persistent portions which may enhance the mechanical properties of the material. The materials may exhibit higher stiffness or strength and ductility values, resulting in higher energy absorption and enhanced protection, as well as, longer lifetimes for product usage. In some cases, the materials may be optically transparent and lightweight, making them suitable for various applications including protective materials.

21 Claims, 16 Drawing Sheets

PROTECTIVE POLYMERIC MATERIALS AND RELATED DEVICES

RELATED APPLICATIONS

This application is a national-stage application under 35 U.S.C. § 371 of International Patent Application Ser. No. PCT/US2008/003077, filed Mar. 7, 2008, entitled "Protective Polymeric Materials and Related Devices," by Tsui, et al., which claims the benefit of U.S. Provisional Application Ser. No. 60/905,512, filed Mar. 7, 2007, entitled "Protective Polymeric Materials and Related Devices," by Tsui, et al., each of which is incorporated herein by reference.

STATEMENT REGARDING FEDERALLY SPONSORED RESEARCH OR DEVELOPMENT

This invention was made with government support under Grant No. DAAD-19-02-D-0002, awarded by the U.S. Army Research Office. The government has certain rights in this invention.

FIELD OF THE INVENTION

The present invention generally relates to polymeric compositions comprising shape-resistant portions.

BACKGROUND OF THE INVENTION

Polymers, including polycarbonates, polysulfones, polyesters, polyimides and polyurethanes are materials useful in a wide range of commercial applications. For example, polycarbonates are commonly used high-$T_g$ (~150° C.) engineering thermoplastic with excellent ductility and optical clarity. Polycarbonates can be non-corrosive, non-toxic, and chemically resistant to both staining and thermal degradation, and have been found to have exceptional impact resistance. With such advantageous physical properties, the commercial applications of polycarbonates are widespread, including automobile parts, CDs, DVDs, windows, visors, coatings, and protective materials. Polycarbonates are often the primary thermoplastic used in ballistic applications due to their light weight and low cost. Improvements to the mechanical behavior of materials such as these would impact a broad range of industries.

SUMMARY OF THE INVENTION

The present invention relates to compositions comprising a polymer comprising a shape-persistent portion, wherein the shape-persistent portion has a molecular weight of at least 15 g/mol, and at least one carbonate, sulfone, or urethane group, wherein the polymer has a mechanical strength at least 5% greater than the mechanical strength of an essentially identical polymer lacking the shape-persistent portion, under essentially identical conditions.

The present invention also relates to compositions comprising a polycarbonate comprising a shape-persistent portion, wherein the shape-persistent portion has a molecular weight of at least 15 g/mol and the polycarbonate comprises at least 1 wt % of the shape-persistent portion, wherein the polycarbonate has a mechanical strength at least 5% greater than a mechanical strength of an essentially identical polycarbonate lacking the shape-persistent molecule, under essentially identical conditions.

The present invention also relates to compositions comprising a polymer comprising the structure,

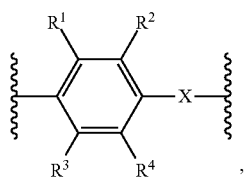

wherein X comprises a carbonate, sulfone, or urethane; $R^1$ and $R^2$ can be the same or different and are hydrogen, alkyl, heteroalkyl, aryl, heteroaryl, or acyl, optionally substituted, or, $R^1$ and $R^2$ are joined together to form a bicyclic ring system having aromatic or non-aromatic groups, optionally substituted; and, $R^3$ and $R^4$ are joined together to form a bicyclic ring system having aromatic or non-aromatic groups, optionally substituted.

DETAILED DESCRIPTION

Figure 1A:
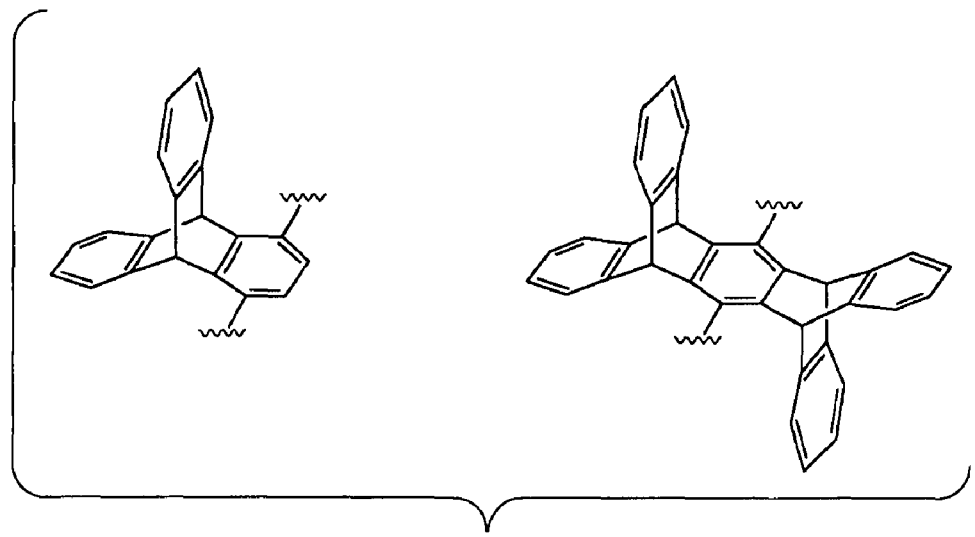
FIG. 1A shows some examples of shape-resistant molecules, such as a triptycene molecule and pentiptycene molecule.

The present invention generally relates to polymeric materials having enhanced properties.

Materials of the present invention may comprise species (e.g., polymers) having structural features which improve one or more properties of the materials. For example, the materials may comprise a polymer molecule having a chemical structure which may promote interactions between various components of the material, enhancing the mechanical properties of the material. In some cases, materials of the present invention may exhibit higher stiffness or strength and ductility values relative to known materials, resulting in higher energy absorption and enhanced protection, as well as longer lifetimes for product usage. In some cases, the materials may be optically transparent, lightweight, and may exhibit rate dependent behavior (i.e., the energy absorption increases with the speed of impact) making them suitable for use as, for example, protective materials. Furthermore, materials of the invention may exhibit improved performance under demanding operating conditions, including higher temperatures, longer operating lifetimes, and the like.

In some embodiments, the present invention relates to materials comprising polymer molecules. The materials may include one or more polymers having various molecular structures and/or properties. In some embodiments, a polymer may comprise a rigid, shape-persistent portion which may improve mechanical strength of the materials. As used herein, a "shape-persistent portion" of a molecule is a portion having a molecular weight of at least 15 g/mol and having a significant amount of rigid structure, as understood by those of ordinary skill in the art. As used herein, a "rigid" structure means a structure, the ends of which are separated by a distance which cannot change (outside of normal molecule-scale changes in temperature, etc.) without breaking at least one bond, as understood by those of ordinary skill in the art. In some embodiments, the shape-persistent portion may have a molecular weight of at least 25, 50, or 100 g/mol. Generally, the shape-persistent portion may not move relative to other portions of the molecule via, for example, rotation about a single bond. For example, the shape-persistent portion may comprise an aromatic ring structure fused to a portion of the polymer via two adjacent atoms of the polymer, such that the shape-persistent portion may not rotate relative to the two adjacent atoms of the polymer.

In some cases, the material may comprise a polymer, or portion thereof, having a rigid or shape-persistent structure in combination with another polymer having a flexible structure. In some cases, the material may comprise a first polymer and a second polymer that comprises a shape-persistent portion, wherein the first polymer has essentially the same structure as the second polymer with the exception that it lacks the shape-persistent portion. In some cases, the material may comprise polymers having substantially the same polymer backbone, but may have different groups pendant to the polymer backbone (e.g., side groups). The polymer(s) may be selected to exhibit a particular desired property, such as mechanical strength, stability at high temperature and/or over prolonged use, optical properties (e.g., emissive properties, transparency, etc.), low or substantially no toxicity, low cost in fabrication, or the like.

Figure 1B:
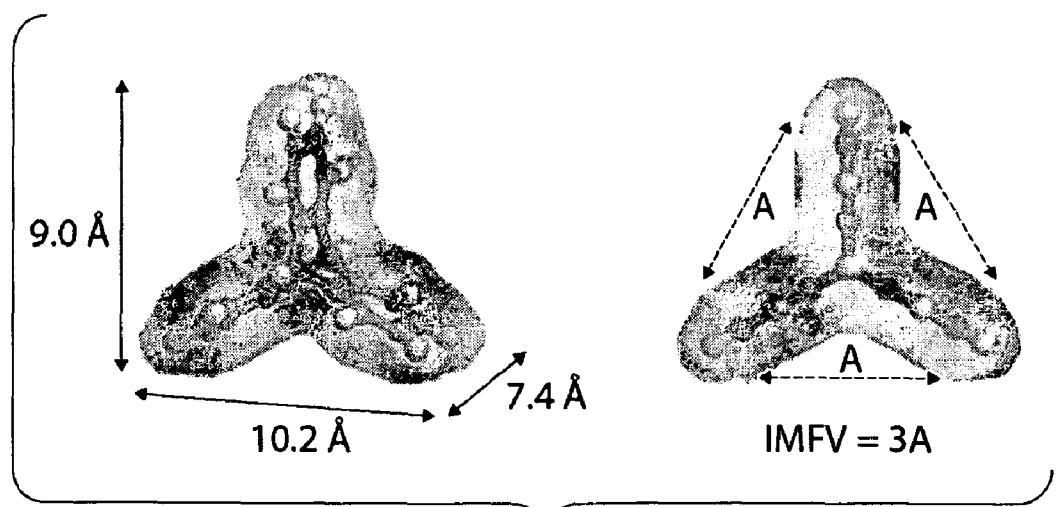
FIG. 1B shows the dimensions and internal molecular free volume (IMFV) of a triptycene molecule.

In an illustrative embodiment, the shape-persistent portion may comprise an iptycene moiety including triptycene or pentiptycene molecules, as shown in FIG. 1A. Iptycenes may be characterized by a unique structural property called internal molecular free volume (IMFV), which refers to the volume in space occupied by a molecule, where boundaries defining the internal free volume span all projections or protrusions of the molecule. For example, FIG. 1B shows the dimensions and internal molecular free volume of a triptycene molecule, defined by the space between planes in a triptycene molecule (e.g., area A).

Figure 2:
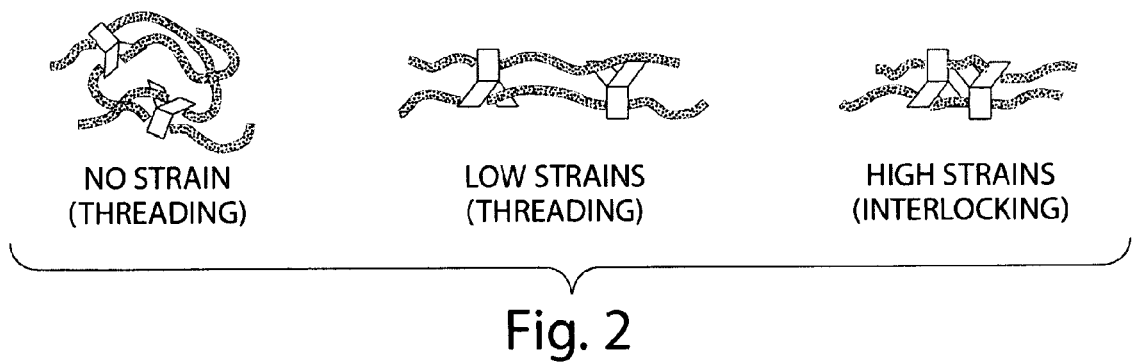
FIG. 2 shows a schematic representation of the interchain interactions between polymers of the invention upon increasing strain, according to one embodiment of the invention.

Incorporation of shape-persistent groups within materials of the invention may enhance the properties of the materials. One advantageous feature of the present invention may be that the shape-resistant portion of the material may increase the mechanical strength of the materials, e.g., by producing interactions between adjacent polymer chains. Without wishing to be bound by theory, the introduction of shape-persistent portions into materials of the present invention may generate molecular threading interactions and/or molecular interlocking interactions between polymer chains. As shown in FIG. 2, under low strain conditions, polymer chain segments may thread through the iptycene moieties, filling in the space provided by the internal free volume of the iptycene units. As strain is increased, iptycene units of different polymer chains or within the same polymer chain may interact to form interlocking structures. Such interactions may result in the minimization of total free volume by packing polymer chain segments into the internal cavities (e.g., free volume) of the iptycene units, which may produce a low energy state having high mechanical strength.

Additionally, polymers comprising shape-resistant portions may exhibit rate dependent energy absorption behavior, wherein the energy absorption of the material may increase with the speed of impact of an object. The combined enhancement in mechanical strength and energy absorption may allow some embodiments of the invention to be useful as protective materials. For example, a high-speed projectile may impact a material of the invention, causing the material to increase in stiffness and/or strength at the location of impact. Deformation of the material may be minimized and/or extremely localized, allowing for protection against multiple impacts, wherein the impacts may occur in close proximity to one another. Such properties may be useful in various applications including ballistic materials and other protective materials including, hard hats, electronic housings, gauge housings, automobile bumpers, etc.

Materials of the invention may include polymers comprising carbonate, aryl ethers, urethane, urea, sulfone, amide, and/or linkages, as well as shape-persistent groups, within the polymer backbone. In some embodiments, the material is a polycarbonate, polysulfone, or polyurethane. In one embodiments, the material is a polycarbonate. In some cases, the material is a polyamide. The polymer may have a mechanical strength at least 5% greater than the mechanical strength of an essentially identical polymer lacking the shape-persistent portion, under essentially identical conditions. In some cases, the polymer has a mechanical strength at least 10%, at least 25%, or at least 50% greater than the mechanical strength of an essentially identical polymer lacking the shape-persistent portion, under essentially identical conditions. For example, polymers that have been modified by appending iptycene groups to the polymer backbone may display considerable improvements in modulus, compressive, and tensile strengths, at both low and high strain rates.

Materials of the invention include polymers, oligomers, copolymers, terpolymers, and quatrapolymers, as well as polymer blends. Polymers, as used herein, refer to extended molecular structures comprising a backbone (e.g., non-conjugated backbone, conjugated backbone) which optionally contain pendant side groups, where the "backbone" refers to the longest continuous bond pathway of the polymer. The polymer may be a homopolymer or a copolymer, such as a random copolymer or a block copolymer. In some cases, at least a portion of the polymer is shape-persistent. For example, the polymer may comprise a non-planar, bicyclic group (e.g., iptycene) that is rigidly attached to the polymer backbone. The shape-persistent portion may produce intermolecular interactions between polymer chains, as described herein. Some embodiments of the invention may comprise polymers having at least 1 wt % of a shape-persistent portion within a polymer. In some cases, the polymer may comprise at least 5 wt %, at least 10 wt %, at least 20 wt %, at least 30 wt %, at least 40 wt %, or, in some cases, at least 50 wt % of a shape-persistent portion within a polymer.

In some cases, the polymer may comprise the structure,

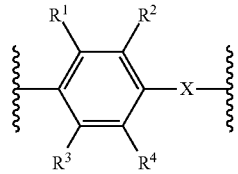

wherein X comprises a carbonate, sulfone, or urethane; $R^1$ and $R^2$ can be the same or different and are hydrogen, alkyl, heteroalkyl, aryl, heteroaryl, or acyl, optionally substituted, or, $R^1$ and $R^2$ are joined together to form a bicyclic ring system having aromatic or non-aromatic groups, optionally substituted; and, $R^3$ and $R^4$ are joined together to form a bicyclic or polycyclic ring system having aromatic or non-aromatic groups, optionally substituted. The bicyclic ring system may comprise an iptycene structure including triptycenes, pentiptycenes, and larger iptycene structures.

In some cases, the polymer comprises a group having the following structure,

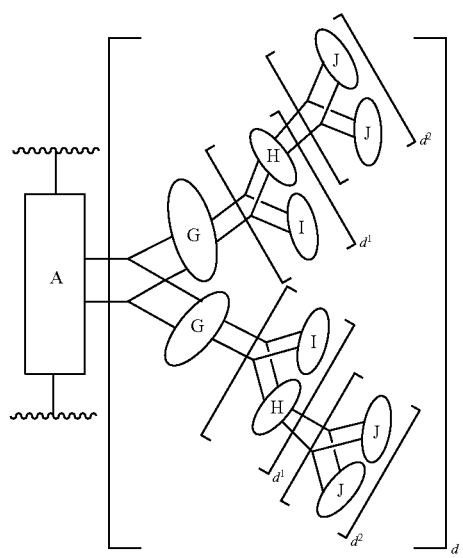

wherein A is a portion of the polymer backbone, such as an aromatic group; G, H, I, and J are aromatic groups, $d=1, 2$, and $d^1=0, 1$, such that when $d^1=0$, $d^2=0$ and when $d^1=1$, $d^2=0, 1$. G and H can be the same or different and are:

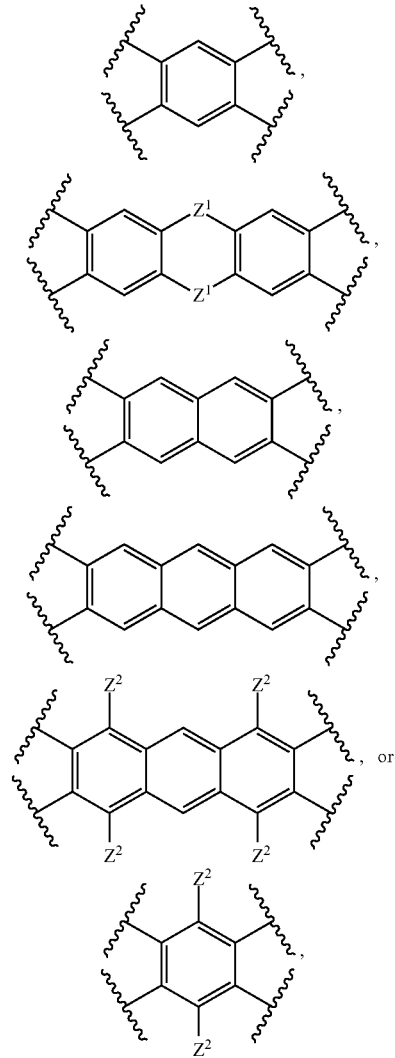

optionally substituted, and I and J may be the same or different and are:

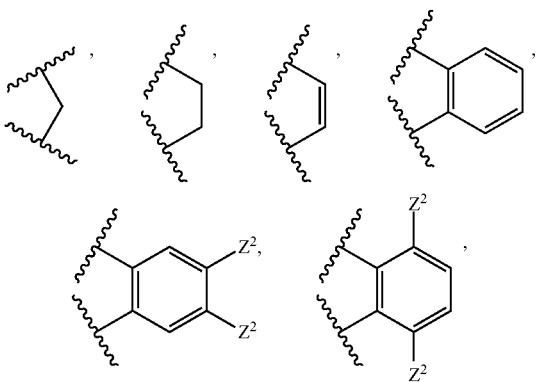

-continued

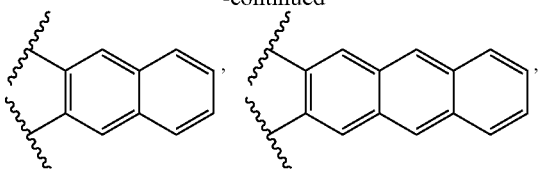

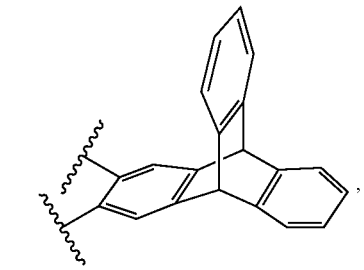

optionally substituted, wherein each $Z^1$ can be the same or different and $Z^1$ is O, S or NR, wherein R is hydrogen, alkyl, heteroalkyl, aryl, or heteroaryl, optionally substituted, and each $Z^2$ can be the same or different and $Z^2$ is halide, alkyl, heteroalkyl, aryl, or heteroaryl, optionally substituted.

In some embodiments, the polymer comprises the structure,

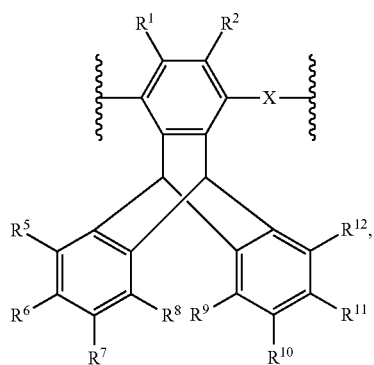

wherein each $R^5$-$R^{12}$ can be the same or different and is hydrogen, alkyl, heteroalkyl, aryl, heteroaryl, or acyl, optionally substituted, and wherein X comprises a carbonate, sulfone, or urethane. For example, in some cases, the polymer molecule comprises a group having the following structure,

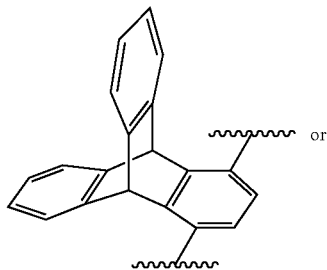

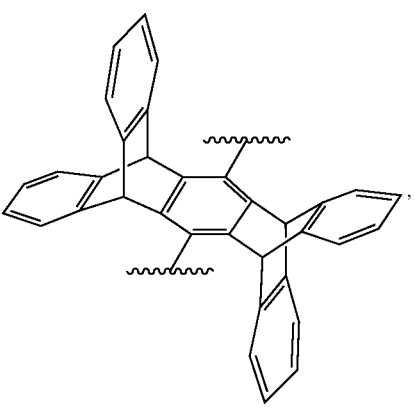

optionally substituted. In some embodiments, the polymer comprises the structure,

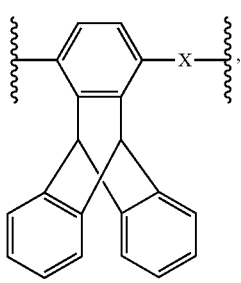

wherein X comprises a carbonate, sulfone, or urethane.

In some embodiments, the polymer may comprise at least monomeric unit comprising a shape-resistant portion. For example, the polymer may comprise groups having the following structure,

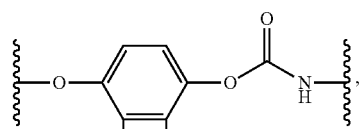
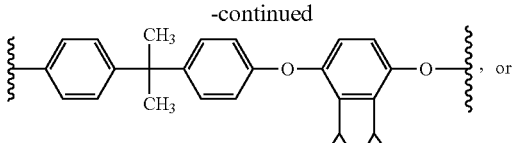
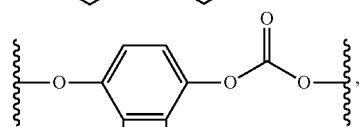
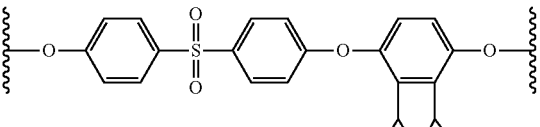
In some embodiments, the polymer may have the following structure,
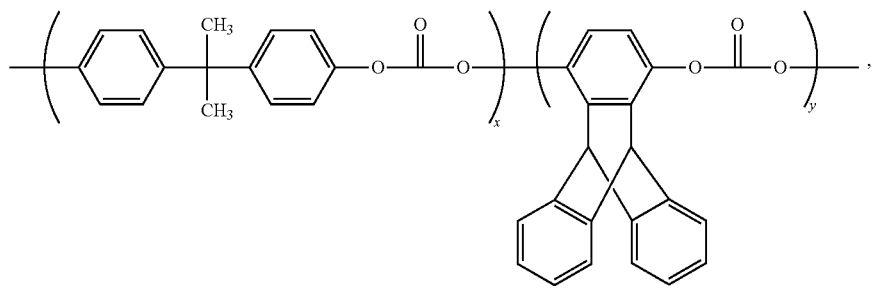
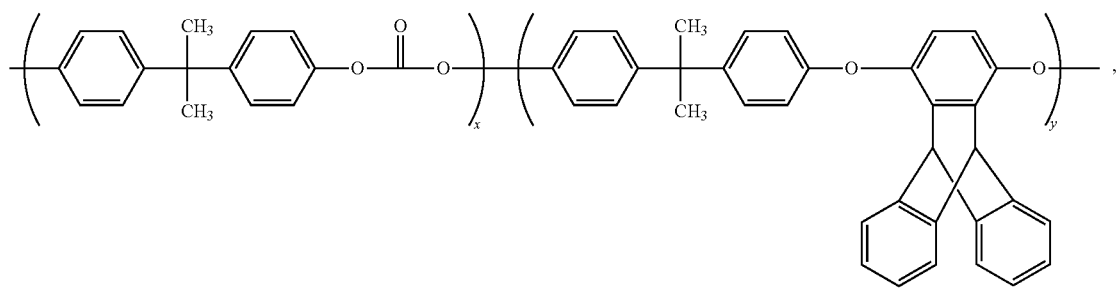
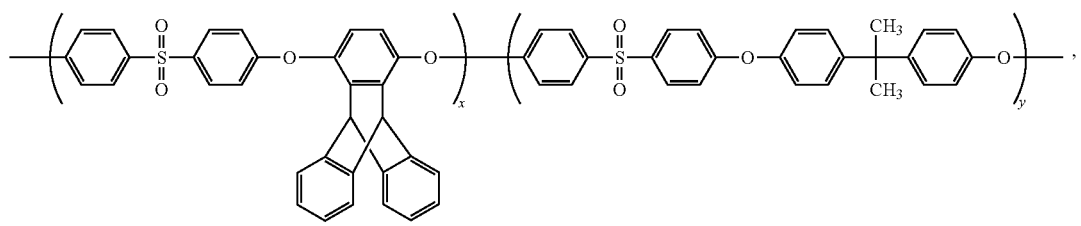
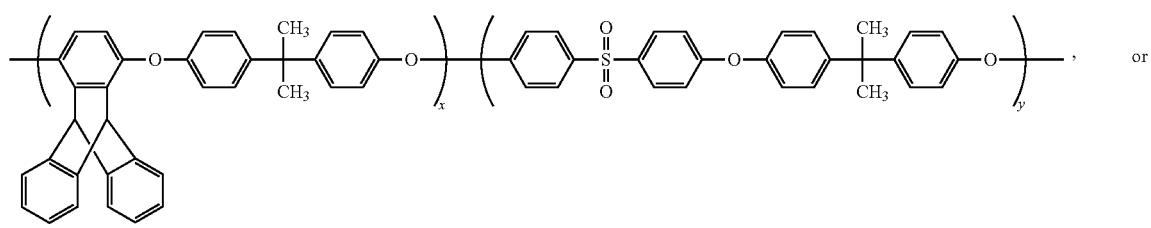

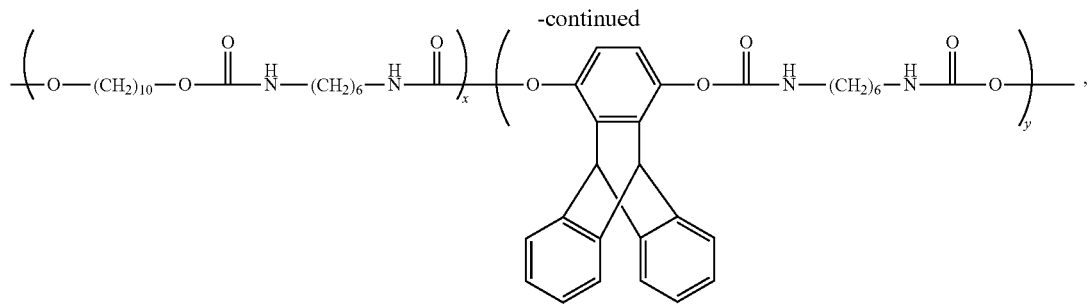

wherein x and y are at least 1. In some cases, x and/or y is at least 10, 100, 1000, 10,000, 50,000, 100,000, or greater.

In some embodiments, materials of the present invention comprise polymer blends. The polymer blend may comprise a combination of polymers, each having different chemical structures and/or properties. In some cases, the polymer blends comprise polymers having different chain lengths. Polymer blends of the invention may comprise at least one polymer having a shape-persistent moiety. For example, the polymer blend may comprise a first polymer, such as a polycarbonate, and a second polymer that comprises a shape-persistent portion, wherein the first polymer has essentially the same structure as the second polymer with the exception that it lacks the shape-persistent portion. In some cases, the polymer blend may comprise a polycarbonate, polysulfone, or polyurethane, as described herein. In some cases, the polymer blend may comprise at least 5 wt %, at least 10 wt %, at least 20 wt %, at least 30 wt %, at least 40 wt %, or, in some cases, at least 50 wt % of a shape-persistent portion within a polymer.

In an illustrative embodiment, the mechanical behavior of a polyester comprising 21 wt % of triptycene, the triptycene rigidly bonded to the polyester backbone, was investigated. A three-fold increase in both stiffness and strength, and a twenty-fold increase in strain to failure, was observed relative to an essentially identical polyester lacking the triptycenes, under essentially identical conditions. In another embodiment, a polymer blend comprising 25 wt. % triptycene exhibited enhanced compressive mechanical properties at both quasistatic and ballistic deformation rates, relative to the analogous polymer blend lacking the triptycenes.

As described herein, the shape-persistent portion may have a combined molecular weight of at least 15 g/mol and may not move relative to other portions of the molecule via rotation about a single bond. As used herein, the term "molecular weight" is given its ordinary meaning in the art and refers to the molecular mass of one molecule of a substance, relative to the unified atomic mass unit u, wherein u is equal to $1/12$ the mass of one atom of carbon-12. The molecular mass may be calculated as the sum of the average atomic masses (or isotopic masses) of all the atoms of a molecule, as found on a standard periodic table and as understood by those of ordinary skill in the art. Rigid structures may be provided, for example, by aromatic groups, bridged, bicyclic and polycyclic structures, and the like. For example, an iptycene molecule is a shape-persistent portion. As a comparative example, a molecule including a cyclic structure such as a benzene ring connected to another portion of the molecule via only a single bond, such as a biphenyl group, has at least a portion of the molecule that is not shape-persistent, since a benzene ring can rotate about a single bond.

Some examples of shape-persistent portions include planar structures, such as aromatic groups (e.g., benzenes, naphthalenes, pyrenes, etc.). The aromatic groups may be rigidly bonded to (e.g., fused to), for example, the polymer backbone, i.e., the aromatic group is bonded via two covalent bonds at adjacent positions on the aromatic ring. In some cases, the shape-persistent portion includes a non-planar structure, such as a bicyclic or polycyclic structure wherein bridgehead atoms are not positioned adjacent to one another. Examples include adamantanes, norbornenes, iptycenes, and the like. In one embodiment, the shape-persistent portion comprises a bicyclic ring system that is non-planar (e.g., an iptycene).

The properties of the polymers may also be tuned based on the substitution of the polymer backbone. Those skilled in the art would recognize what types of functional groups would afford a particular, desired property, such as size, stability at high temperatures, biocompatibility, emissive properties, etc. For example, the polymer may be substituted with electron-withdrawing groups, such as fluorine, acyl, carboxyl, cyano, nitro, sulfonate, or the like, or the polymer may be substituted with electron-withdrawing aryl groups along the polymer backbone. In other embodiments, the monomers may be substituted with electron-rich groups, such as amino, hydroxy, alkoxy, acylamino, acyloxy, alkyl, halide, and the like, or the monomers may be substituted with electron-rich aryl groups along the backbone of the polymer.

Polymers of the invention may by synthesized (e.g., polymerized) according to methods known in the art. For example, the polymerization may comprise cationic polymerization, anionic polymerization, radical polymerization, condensation polymerization, Wittig polymerization, ring-opening polymerization, cross-coupling polymerization, addition polymerization, or chain polymerization. Those of ordinary skill in the art would be able to select the appropriate combinations of monomers and/or other reagents in order to obtain a desired polymeric product. For example, monomers comprising two hydroxyl groups may be polymerized with monomers comprising two carbonyl groups (e.g., acyl halide, carboxylic acid, etc.) to form a polyether via condensation polymerization. Likewise, polycarbonates may be synthesized via condensation polymerization, including the condensation between diphenylcarbonate and a diphenol molecule. In some cases, polysulfones may be synthesized via step polymerizations, such as the step polymerization between dichlorodiphenylsulfone and a diphenol molecule. Polyureas may be synthesized via polymerization of a diisocyanate molecule and urea, while polyurethanes may be synthesized via polymerization of a diisocyanate molecule and a molecule containing hydroxyl groups.

The polymers may be characterized using various methods known in the art. For example, the average molecular weight values ($M_n$ and $M_w$) of the polymers may be determined via gel permeation chromatography (GPC) with an eluent. The eluent may be, for example, THF or DMF.

As described herein, some embodiments of the invention may exhibit increased mechanical strength under high strain conditions. The "mechanical strength" of a material refers to the stress, deformation, strain, and/or stress-strain properties of a material. For example, the mechanical strength may refer to the compressive strength, tensile strength, or shear strength, or, more specifically, the compressive stress, tensile stress and/or shear stress of a material. The enhanced mechanical strength may be studied by methods known to those of ordinary skill in the art. For example, compression tests, stress tests, dynamic mechanical thermal analysis, and other known methods may be used to evaluate the level of mechanical strength in materials of the invention. Another method may involve the observation of the rate-dependent yield behavior of a material, which may reflect changes in the mobility of polymer chain segments. For example, upon high strain conditions, decreased mobility of polymer chain segments may generate an observable change in the deformation resistance of the material, as described more fully below.

Other advantageous features of the invention may be that, in some cases, the materials are optically transparent, lightweight, and/or non-toxic, in addition to exhibiting high mechanical strength. The combination of such features allows materials of the invention to be useful in a broad range of applications including transparent protective applications. Examples of such applications include safety glasses/goggles, military visors, visors for sports equipment, blast shields, riot shields, bullet-resistant glass, automobile windows, window glazing, anti-scratch coatings, liquid crystal displays (LCDs), wind screens, motorcycle helmets, CDs, DVDs, refrigerator crisper trays, lighting fixtures, aircraft windows, aircraft canopies, automotive moon roofs, automotive head lamps, etc. Because the materials may also be substantially non-toxic, they may be used in contact with food and in medical devices. Examples of such applications include measuring cups/glasses, utensils, salt/pepper shakers, plates/bowls, dispensers, containers, tubing, etc.

The "internal molecular free volume" or "free volume" of a molecule is defined as the volume in space taken up by a molecule, where boundaries defining the internal free volume span all projections or protrusions of the molecule. Shape-persistent molecules may be considered to have a length, width, and thickness. These dimensions may be considered to span an imaginary box which the molecule, as defined by its van der Waals volume, may rest. The molecule may be positioned within the box, in relation to a set of x, y, and z axes, such that the shortest axis in the arrangement defines the molecule's thickness. The minimum thickness of a planar shape-persistent molecule may be defined as the distance between the portions of the molecule located above and below a plane within which the molecule can be defined (or which can be contained completely within the molecule), for example a plane defined by the carbon nuclei of benzene ring. For example, in a benzene ring, the van der Waals radii for the carbon atoms is about ±1.9 Å. A second example is a molecule such as [2.2.2]bicyclooctane, where the thickness of the molecule would be measured from the van der Waals contacts of the outer hydrogen atoms, or about 5.54 Å.

While these examples may have shape-persistent structures, it should be understood that these structures do not define the internal free volume. Rather, the internal free volume is defined by the volume in space taken up by the molecule, where boundaries defining the internal free volume span all projections or protrusions of the molecule. This can be easily understood with reference to FIG. 1B, wherein the area A is the free volume defined by the space between planes in a triptycene molecule. The internal free volume need not be totally enclosed, and a combination of enclosed and open volumes in structures together can define free volume within the scope of the invention. The interior free volumes of such structures may be defined by objects that have an external plane that may be directed along one axis. Another architecture is one in which the internal space of the object may further be enclosed by additional objects, for example, objects having a concave surface, creating an even greater delineation between internal and external space.

The shape-persistent portion may have a minimum height or length of approximately 6.214 Å, a value based on the distance between the van der Waals contacts of the 1 and 4 hydrogen atoms of a benzene ring. In some embodiments, the shape-persistent portion includes bridgehead atoms, wherein the minimum distance that the portion may extend in height or length from a bridgehead atom is 3.5 Å. In some cases, the minimum distance that a molecule may extend in height or length from a bridgehead atom is 4.0 Å, 4.5 Å, 5.0 Å, 5.5 Å, 6.0 Å, or 6.2 Å. In some embodiments, the length of the molecule may be at least twice the height of the molecule. The longer dimension may lie on a two-dimensional plane normal to that height.

The term "alkyl" refers to the radical of saturated aliphatic groups, including straight-chain alkyl groups, branched-chain alkyl groups, cycloalkyl(alicyclic) groups, alkyl substituted cycloalkyl groups, and cycloalkyl substituted alkyl groups. The alkyl groups may be optionally substituted, as described more fully below. Examples of alkyl groups include, but are not limited to, methyl, ethyl, propyl, isopropyl, butyl, isobutyl, tert-butyl, 2-ethylhexyl, cyclopropyl, cyclobutyl, cyclopentyl, cyclohexyl, and the like. "Heteroalkyl" groups are alkyl groups wherein at least one atom is a heteroatom (e.g., oxygen, sulfur, nitrogen, phosphorus, etc.), with the remainder of the atoms being carbon atoms. Examples of heteroalkyl groups include, but are not limited to, alkoxy, poly(ethylene glycol)-, alkyl-substituted amino, tetrahydrofuranyl, piperidinyl, morpholinyl, etc.

The term "aryl" refers to an aromatic carbocyclic group having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl), all optionally substituted. "Heteroaryl" groups are aryl groups wherein at least one ring atom in the aromatic ring is a heteroatom, with the remainder of the ring atoms being carbon atoms. Examples of heteroaryl groups include furanyl, thienyl, pyridyl, pyrrolyl, N-lower alkyl pyrrolyl, pyridyl-N-oxide, pyrimidyl, pyrazinyl, imidazolyl, indolyl and the like, all optionally substituted.

The terms "amine" and "amino" refer to both unsubstituted and substituted amines, e.g., a moiety that can be represented by the general formula: N(R')(R")(R"') wherein R', R", and R"' each independently represent a group permitted by the rules of valence.

The terms "acyl," "carboxyl group," or "carbonyl group" are recognized in the art and can include such moieties as can be represented by the general formula:

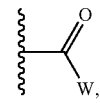

wherein W is H, OH, O-alkyl, O-alkenyl, or a salt thereof. Where W is O-alkyl, the formula represents an "ester." Where W is OH, the formula represents a "carboxylic acid." In general, where the oxygen atom of the above formula is replaced by sulfur, the formula represents a "thiolcarbonyl" group. Where W is a S-alkyl, the formula represents a "thiolester." Where W is SH, the formula represents a "thiolcarboxylic acid." On the other hand, where W is alkyl, the above formula represents a "ketone" group. Where W is hydrogen, the above formula represents an "aldehyde" group.

As used herein, the term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" must still comprise the phenyl moiety and can not be modified by substitution, in this definition, to become, e.g., a heteroaryl group such as pyridine. In a broad aspect, the permissible substituents include acyclic and cyclic, branched and unbranched, carbocyclic and heterocyclic, aromatic and non-aromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

Examples of substituents include, but are not limited to, alkyl, aryl, aralkyl, cyclic alkyl, heterocycloalkyl, hydroxy, alkoxy, aryloxy, perhaloalkoxy, aralkoxy, heteroaryl, heteroaryloxy, heteroarylalkyl, heteroaralkoxy, azido, amino, halogen, alkylthio, oxo, acylalkyl, carboxy esters, carboxyl, -carboxamido, nitro, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, alkoxyalkyl, perhaloalkyl, arylalkyloxyalkyl, and the like.

EXAMPLES

Example 1

A series of four triptycene-polycarbonate polymers (T-PCs), P1-P4, were prepared with various molar quantities of triptycene incorporated into the backbone of the polycarbonate. The molar level of triptycene incorporated in the polymers included 0%, 5%, 10%, and 15%. Polymers P1-P4 were prepared by the reaction as illustrated in Scheme 1 to produce polycarbonates having various amounts of triptycene (e.g., "PC/triptycene"), as indicated in Table 1. Melt condensation of bisphenol A, diphenylcarbonate, and triptycene hydroquinone in the presence of a base catalyst afforded the polymers P1-P4. By-products, such as a phenol by-product, may be removed by distillation under vacuum as it is formed.

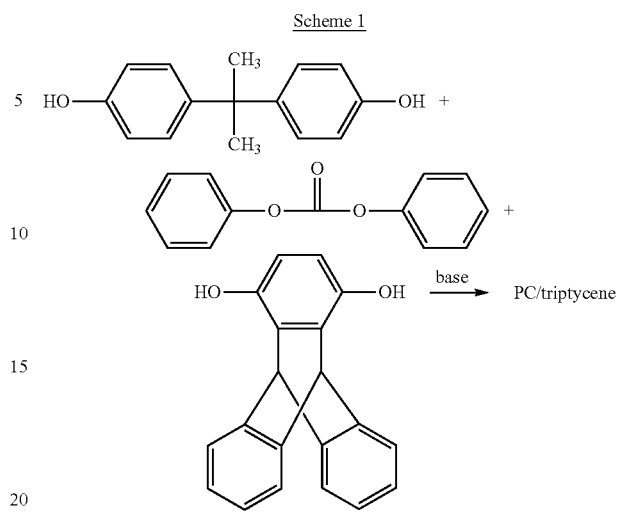

Scheme 1

The following procedure was followed to produce a polymer incorporating 5 molar % triptycene (P2). All glassware was dried overnight at 110° C. and assembled while hot under a nitrogen purge. A 250 mL three-neck round bottom flask was equipped with an overhead stirrer using a vacuum tight seal, and a 6-inch distillation column with a vacuum distillation head. The flask was charged with 40.803 grams bisphenol A (0.178 Moles), 42.15 grams diphenyl carbonate (0.196 moles), and 2.693 grams triptycene hydroquinone (0.009 moles). The contents were heated with stirring to 225° C. in an oil bath under nitrogen. The vacuum was turned on, and then slowly over a 2 hour period was slowly increased to full vacuum. During this period, the temperature of the oil bath was increased to 250° C., and phenol by-products were distilled out of the reaction mixture. The reaction was held at 250° C. and under full vacuum for 2 hours. At the end of this period the reaction mixture was very thick and the material was observed to climb up the stirrer shaft. At this point, the heat was removed and the stirring stopped. Once the reaction cooled to room temperature, the vacuum was released, and the contents of the reaction flask were removed by breaking the flask. Approximately 40 grams of a soluble, transparent, and nearly colorless polymer was obtained.

This general procedure was repeated for polymers P1, P3, and P4 with the ratios of bisphenol A to triptycene hydroquinone as shown in Table 1.

The reactions gave polymer product that was fully soluble in dichloromethane. The material made with 100% bisphenol A was very light in color. As the molar amount of triptycene was increased in the formulation, the color of the polymer became progressively darker. However thin films of all the material were transparent, and appeared almost colorless.

TABLE 1

Molar Ratios of Bisphenol A to Triptycene for Polymers P1'-P4'.

| Sample | Ratio bisphenol A:triptycene | % Bisphenol A | % Triptycene Hydroquinone |
|---|---|---|---|
| P1 | 100:0 | 100 | 0 |
| P2 | 95:5 | 95 | 5 |
| P3 | 90:10 | 90 | 10 |
| P4 | 85:15 | 85 | 15 |

Example 2

The series of four polycarbonate samples described in Example 1 (P1-P4) and, for comparison, a commercial polycarbonate made by Bayer (Makrolon 3103) were characterized by relative viscosity, glass transition temperature ($T_g$), and stress strain curves of solvent cast thin films.

Relative Viscosity

Relative viscosities were measured using an Ubbelohde Tube. A solution containing 0.1 gram polycarbonate in 20 mL of dichloromethane was prepared and filtered into a 0 C Ubbelohde Tube. The time for the required volume of solution to flow at 25° C. was measured. The ratio of the solution to pure dichloromethane is the reported relative viscosity found in Table 2.

TABLE 2

Relative Viscosity of PC/Triptycene Samples.

| Sample | Ratio bisphenol A:triptycene | Relative Viscosity |
| --- | --- | --- |
| P1 | 100:0 | 1.22 |
| P2 | 95:5 | 1.34 |
| P3 | 90:10 | 1.22 |
| P4 | 85:15 | 1.28 |
| Makrolon 3103 | | 1.31 |

The viscosity data indicates that there is significant variation among the samples, with the 90-10 sample in particular having a low viscosity. This result seemed to correlate with the observations during thin film casting and tensile testing, as described more fully below. Moreover, the variation in viscosity among the samples may be related to the lack of a cross-linking agent, so we will add 0.25 mol % for the next series of runs on a 200 g scale.

Glass Transition Temperature

Figure 3:
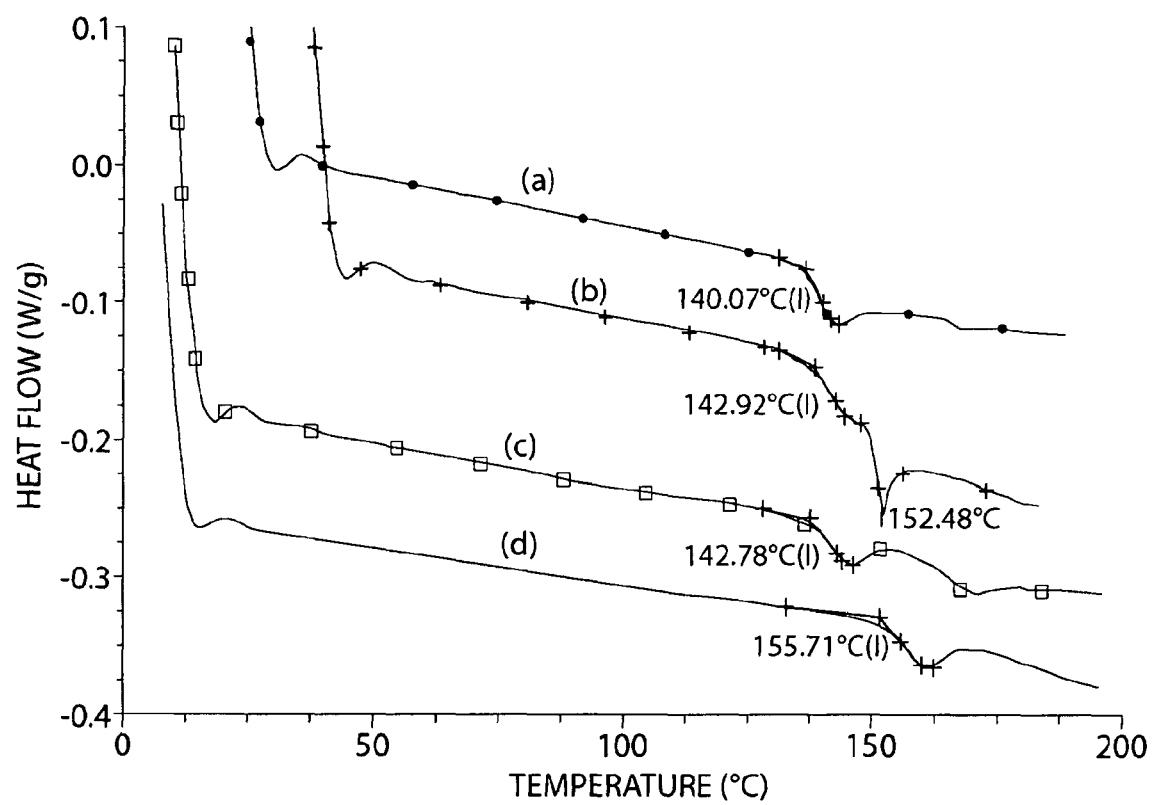
FIG. 3 shows the glass transition temperature ($T_g$) curves for polymers having a bisphenol A:tripytcene ratio of (a) 100:0, (b) 95:5, (c), 90:10, and (d) 85:15.
Figure 4A:
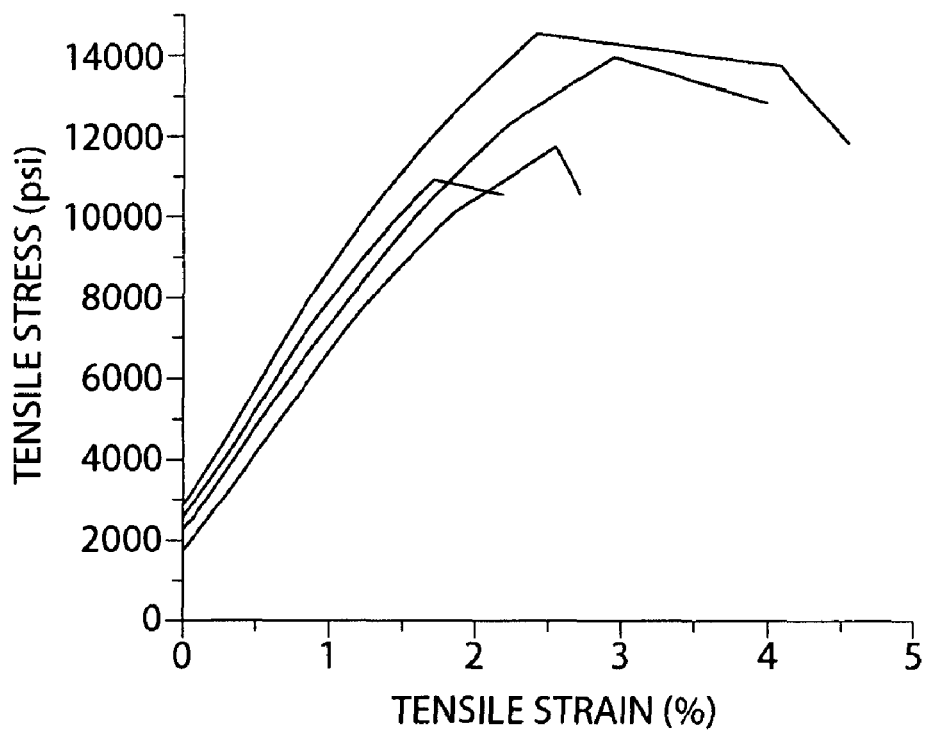
FIG. 4 shows the stress-strain curves for thin films of polymers having a bisphenol A:tripytcene ratio of (a) 100:0, (b) 95:5, (c) 85:15, and (d) a thin film of Makrolon 3103.
Figure 4B:
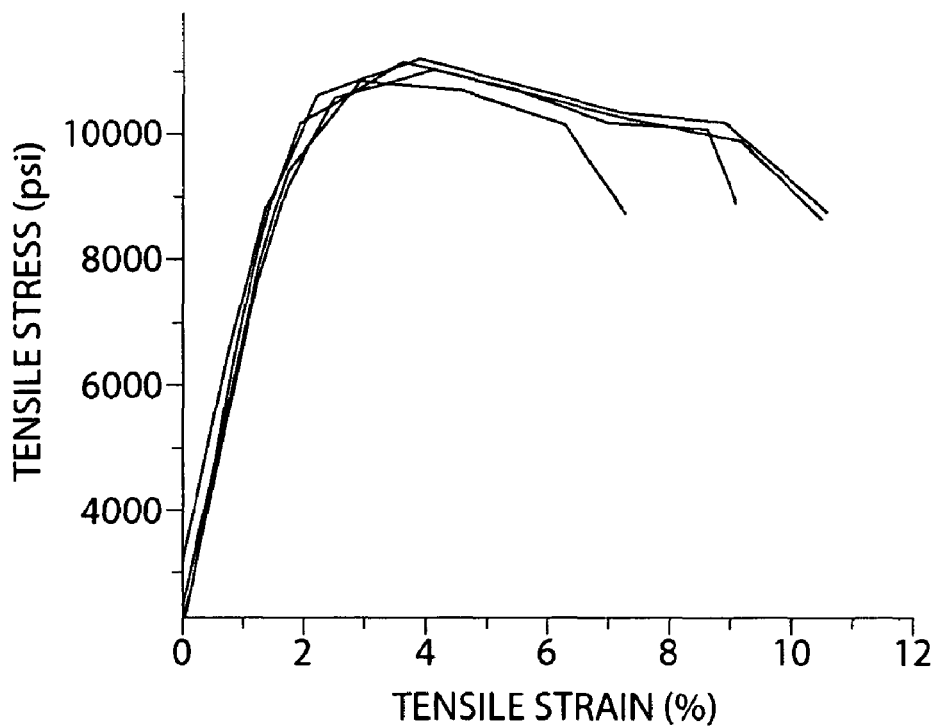
Figure 4C:
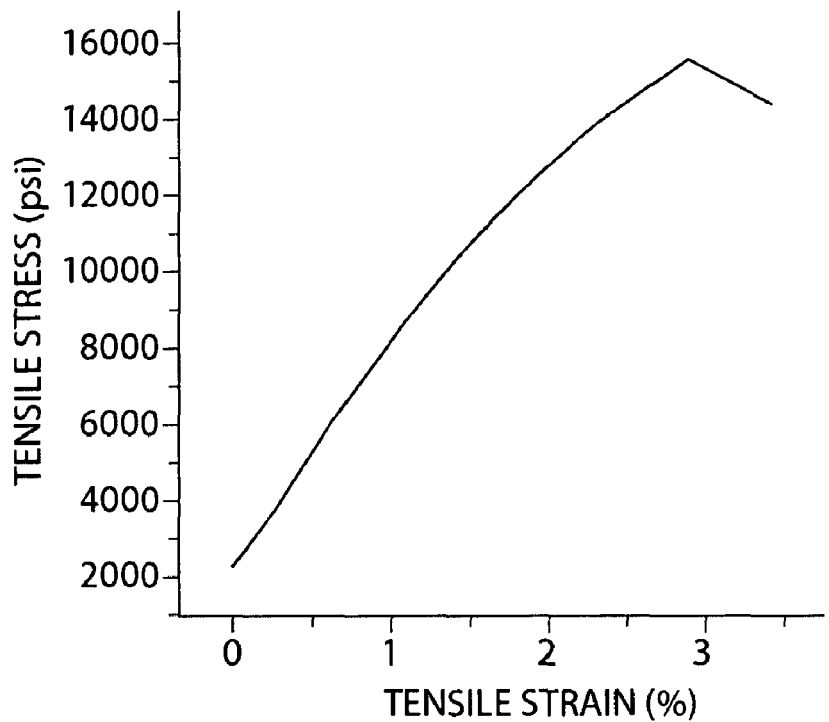
Figure 4D:
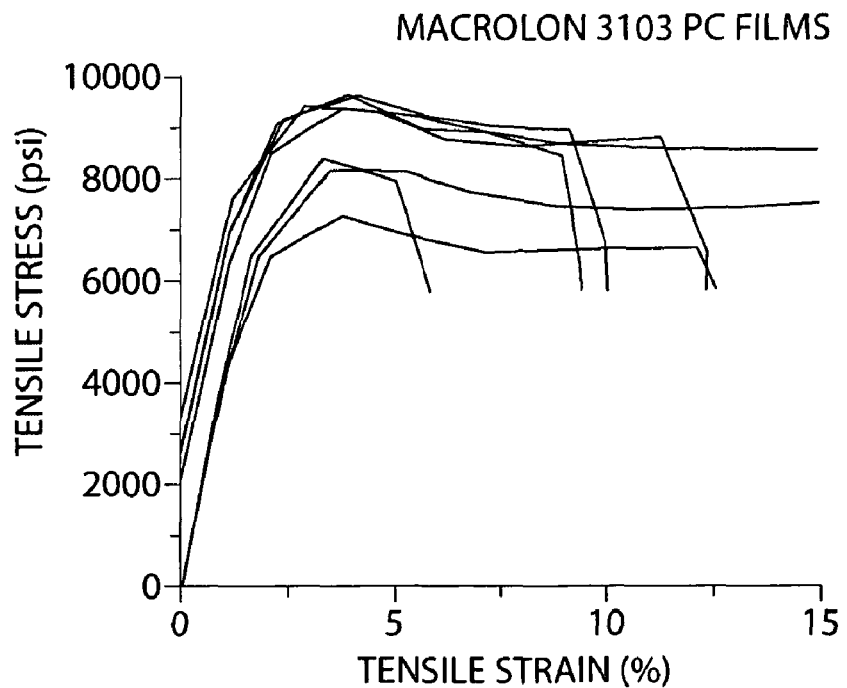

Glass transition temperatures ($T_g$) of the polymer samples were measured on a TA Instruments 2010 DSC, at a rate of 10° C. per minute. FIG. 3 shows the $T_g$ curves for (a) P1, (b) P2, (c), P3, and (d) P4. As shown in FIG. 3, higher $T_g$ values were observed for samples containing increasing molar amounts of triptycene in the polycarbonate backbone. P2 exhibited a melting transition at 152.5, indicating some crystallinity, and P3 exhibited two, distinct $T_g$ transitions. The $T_g$ values for the polymers were as follows: 140.1° C. for P1, 142.9° C. for P2, 142.8° C. for P3, 155.7° C. for P4.

Stress Strain Curves of Solvent Cast Thin Films

Thin films (ca. 1 mil) of the polymers P1-P4 and the Makrolon 3101 polymer were draw cast from dichloromethane solutions onto glass plates and allowed to air dry for several hours (until tack free), then placed in a convection oven at 50° C. overnight. All of the films were clear and colorless. After cooling to room temperature, all of the films, except the P3 sample, could be gently pulled off of the glass to give freestanding films, which was too brittle, and tore into small pieces when being removed from the glass, which may be a result of the low relative viscosity of this sample compared to all others, indicating the presence of a larger amount of oligomeric species present.

Micro dogbones were cut out of the films using a die, and stress/strain measurements were measured in tensile mode on an Instron machine. The results of the measurements are tabulated in Table 3, and the actual stress/strain curves are shown in FIGS. 5-8.

TABLE 3

Stress/Strain Data of PC/Triptycene.

| Sample | | Thickness (in) | Maximum Load (lbf) | Strain at Break (%) | Stress @ Maximum Load (ksi) | Modulus (ksi) |
| --- | --- | --- | --- | --- | --- | --- |
| P1 | Avg. | 0.00085 | 2.15 | 3.41 | 12.68 | 549 |
| | Std. Dev. | 0 | 0.30 | 0.95 | 1.79 | 252 |
| P2 | Avg. | 0.001 | 2.25 | 9.07 | 11.26 | 499 |
| | Std. Dev. | 0 | 0.06 | 1.79 | 0.28 | 52 |
| P4 | Avg. | 0.0011 | 2.80 | 5.20 | 12.75 | 489 |
| | Std. Dev. | 0 | 0.07 | 1.36 | 0.33 | 14 |
| Makrolon 3103 | Avg. | 0.00065 | 0.98 | 14.12 | 7.49 | nm |
| | Std. Dev. | 0 | 0.11 | 4.50 | 0.85 | — |

The stress-strain curves for the thin films are shown in FIG. 4 for (a) the P1 film, (b) the P2 film, (c) the P4 film, and (d) the Makrolon 3103 film. The stress-strain curves indicate that the P2 film and the Makrolon 3103 film showed a yielding behavior with a strain to yield about 3%, whereas both the P1 film and the P4 film showed brittle failure at about 5% elongation. The strain to break of the Makrolon 3103 film was the highest at about 14%; however, the strength of the iptycene-containing films was significantly higher, at about 12 ksi compared to 7.5 ksi. Modulus values varied little with composition, at about 500 ksi.

Example 3

A series of four triptycene-polycarbonate polymers (T-PCs), P1'-P4', were prepared as described in Example 1, with the exception that approximately 0.2 molar percent of 1,1,1-tris(4-hydroxy-phenyl)ethane was added to the reaction mixture as the crosslinking agent.

The following procedure was followed to produce a polymer incorporating 5 molar % triptycene (P2'). All glassware was dried overnight at 110° C. and assembled while hot under a nitrogen purge. A 500 mL three neck round bottom flask was equipped with an overhead stirrer using a vacuum tight seal and a 6-inch distillation column with a vacuum distillation head. The flask was charged with 173.16 grams bisphenol A (0.758 mol), 171.36 grams diphenyl carbonate (0.8 mol), 0.44 grams 1,1,1-tris(4-hydrixyphenyl)ethane (0.00145 mol), and 11.44 grams triptycene hydroquinone (0.04 mol). The contents were heated with stirring to 225° C. in an oil bath under nitrogen. The vacuum was turned on, and then slowly over a 2 hour period was slowly increased to full vacuum. During this period the temperature of the oil bath was increased to 250° C. During this period phenol distilled out of the reaction mixture. The reaction was held at 250° C. and under full vacuum for 2 hours. At the end of this period the reaction mixture was very thick and the material was observed to climb up the stirrer shaft. At this point, the heat was removed and the stirring stopped. Once the reaction cooled to room temperature, the vacuum was released, and the contents of the reaction flask were removed by breaking the flask. Approximately 160 grams of polymer P2' were recovered.

This general procedure was repeated for polymers P1', P3', and P4' with the ratios of bisphenol A to triptycene hydroquinone as shown in Table 4.

TABLE 4

Molar Ratios of Bisphenol A to Triptycene for Polymers P1'-P4'.

| Sample | Ratio bisphenol A:triptycene | % Bisphenol A | % Triptycene Hydroquinone |
|---|---|---|---|
| P1' | 100:0 | 100 | 0 |
| P2' | 95:5 | 95 | 5 |
| P3' | 90:10 | 90 | 10 |
| P4' | 85:15 | 85 | 15 |

Figure 5:
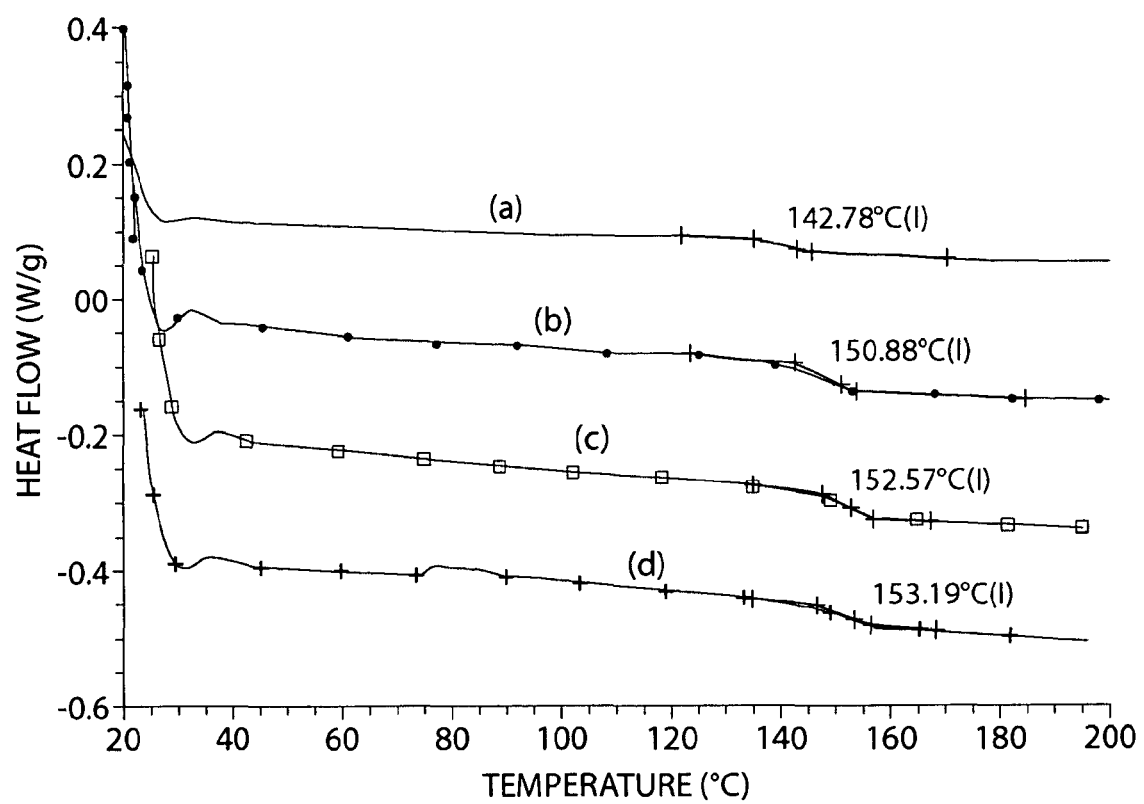
FIG. 5 shows the $T_g$ curves for polymers synthesized in the presence of a crosslinking agent and having a bisphenol A:tripytcene ratio of (a) 100:0, (b) 95:5, (c), 90:10, and (d) 85:15.

Glass transition temperatures ($T_g$) of the polymer samples were measured on a TA Instruments 2010 DSC, at a rate of 10° C. per minute. FIG. 5 shows the $T_g$ curves for (a) P1', (b) P2', (c), P3', and (d) P4'. As shown in FIG. 5, a slight trend toward higher Tg was observed for samples containing increasing molar amounts of triptycene in the polycarbonate backbone. The $T_g$ values for the polymers were as follows: 142.8° C. for P1', 150.9° C. for P2', 152.6° C. for P3', 153.2° C. for P4'.

To prepare samples for injection molding, the polymers were dissolved in dichloromethane, filtered, and poured slowly into methanol with vigorous stirring to precipitate the polymer as a coarse white powder. The precipitate is then filtered, and vacuum dried to give an off white coarse amorphous powder.

Example 4

Polyphosphates containing various amounts of iptycenes in the polymer backbone were also synthesized. The polymers were analogs of Triton's flame retardant polyphosphonates (FX Polymer). As illustrated in Scheme 2, FX/triptycenes were synthesized by melt condensation of bisphenol A with diphenyl methyl phosphonate and triptycene hydroquinone. Phenol that may have been formed during polymerization may be removed by distillation.

Scheme 2

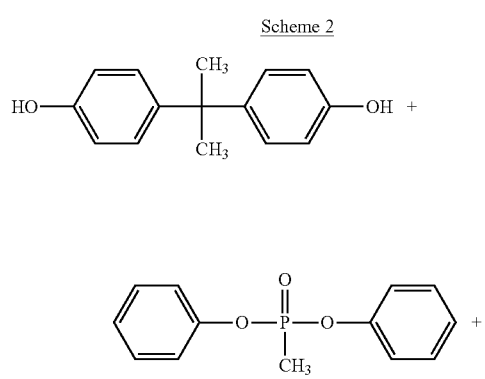

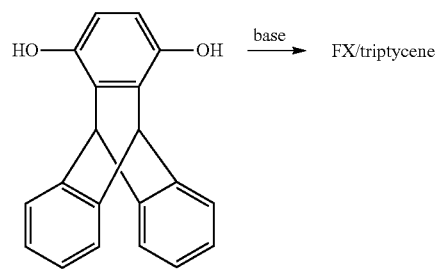

The following procedure was followed to produce a FX/triptycene polymer incorporating 5 molar % triptycene (P2'). All glassware was dried overnight at 110° C. and assembled while hot under a nitrogen purge. A 250 mL three neck round bottom flask was equipped with an overhead stirrer using a vacuum tight seal, and a 6-inch distillation column with a vacuum distillation head. The flask was charged with 31.62 grams bisphenol A (0.138 mol), 39.26 grams diphenyl methyl phosphonate (0.158 mol), 2.09 grams triptycene hydroquinone (0.0073 mol), and 0.459 grams 1,1, 1-tris(4-hydroxyphenyl)ethane (0.0015 mol). The contents were heated with stirring to 225° C. in an oil bath under nitrogen. The vacuum was turned on, and then slowly over a 2 hour period was slowly increased to full vacuum. During this period the temperature of the oil bath was increased to 250° C. and phenol was distilled out of the reaction mixture. The reaction was held at 250° C. and under full vacuum for 2 hours. At the end of this period the reaction mixture was very thick and was observed to climb up the stirrer shaft. At this point, the heat was removed and the stirring stopped. Once the reaction cooled to room temperature, the vacuum was released, and 0.04 grams of Irgafos 168 (a stabilizer obtained from Ciba) was added. The flask was evacuated to full vacuum again and heated to 250° C. for 2.5 hours, then the temperature increased to 280-310° C. for 2 hours. The heat was then removed and the reaction allowed to cool to room temperature. The contents of the reaction flask were removed by breaking the flask.

FX/triptycene polymers with 10% and 15% triptycene, and a control of FX Polymer without triptycenes were also prepared.

Example 5

A series of iptycene-containing polymer blends were produced and characterized. Table 5 lists the different types of polycarbonates that were used to prepare the polymer blends. The polymers contain various ratios of triptycene units to polycarbonate units. (T/PC). The average molecular weight values ($M_n$ and $M_w$) and polydispersity index (PDI) for the polymers were determined via gel permeation chromatography (GPC) with THF eluent. IUP is a high viscosity grade bisphenol-A polycarbonate supplied by Mitsubishi Engineering Plastics under the commercial name Iupilon E2000. A 0/100 T/PC polymer and a 7/93 T/PC polymer 7/93 T/PC were both supplied by Triton Systems, Inc. of Chelmsford, Mass. The 0/100 T/PC polymer is a low molecular weight bisphenol-A polycarbonate that served as a baseline for the 7/93 T/PC polymer 7/93 T/PC, a polycarbonate-triptycene copolymer containing 7.7 wt % triptycene hydroquinone. High molecular weight polymers having 5/95, 15/85, and 25/75 T/PC ratios, were synthesized by a process described in Example 10.

TABLE 5

Iptycene-containing polymers.

| Polymer | $M_n$ (g/mol) | $M_w$ (g/mol) | PDI |
|---|---|---|---|
| (IUP) | 29,900 | 67,00 | 2.2 |
| (0/100 T/PC) | 13,100 | 30100 | 2.3 |
| (7/93 T/PC) | 5,900 | 22,000 | 3.7 |
| (5/95 T/PC) | 28,200 | 55,700 | 1.98 |
| (15/85 T/PC) | 29,600 | 60,700 | 2.05 |
| (25/75 T/PC) | 29,900 | 67,500 | 2.26 |

From the three polymers listed in Table 5, two different polymers blends with commercial PCs were prepared for mechanical characterization. Polymer Blend A contained 25 wt % 0/100 T/PC polymer in IUP. Polymer Blend B contained 25 wt % 7/93 T/PC polymer 7/93 T/PC in IUP, yielding an overall triptycene concentration of about 1.90 wt %. The blends were prepared by dilute solvent mixing with a spinner in dichloromethane at room temperature overnight. Solutions were allowed to evaporate in a fume hood for 2-3 days in Teflon dishes, leaving behind crystallized films. The films were ground into a fine powder and then stored in a vacuum oven, along with fine powder sample of IUP, at 120° C. overnight before melt processing. For all three samples, disks of about 50 mm in diameter and 3 mm in thickness were compression molded at 265° C. Finally, the compression molded disks were machined into three specified sample geometries: cylinders, rectangular bars, and dogbones. All samples were dried at 55° C. under vacuum for a week before mechanical testing.

Figure 6:
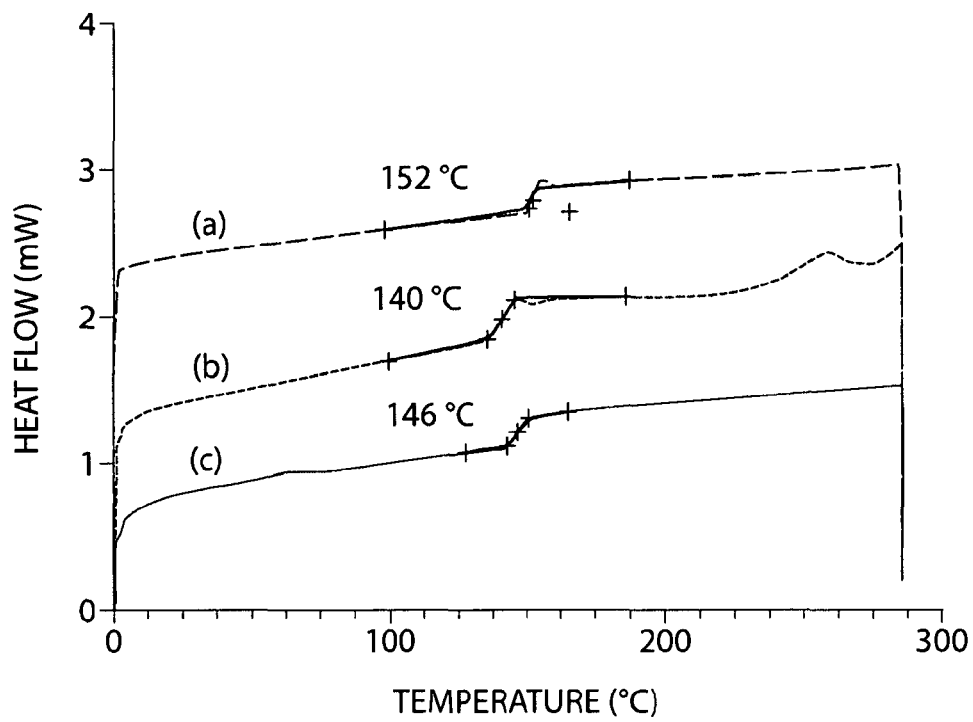
FIG. 6 shows DSC scans of (a) IUP ($2^{nd}$ cycle), (b) 0/100 T/PC ($2^{nd}$ cycle), and (c) Polymer Blend A ($2^{nd}$ cycle) after processing.
Figure 7:
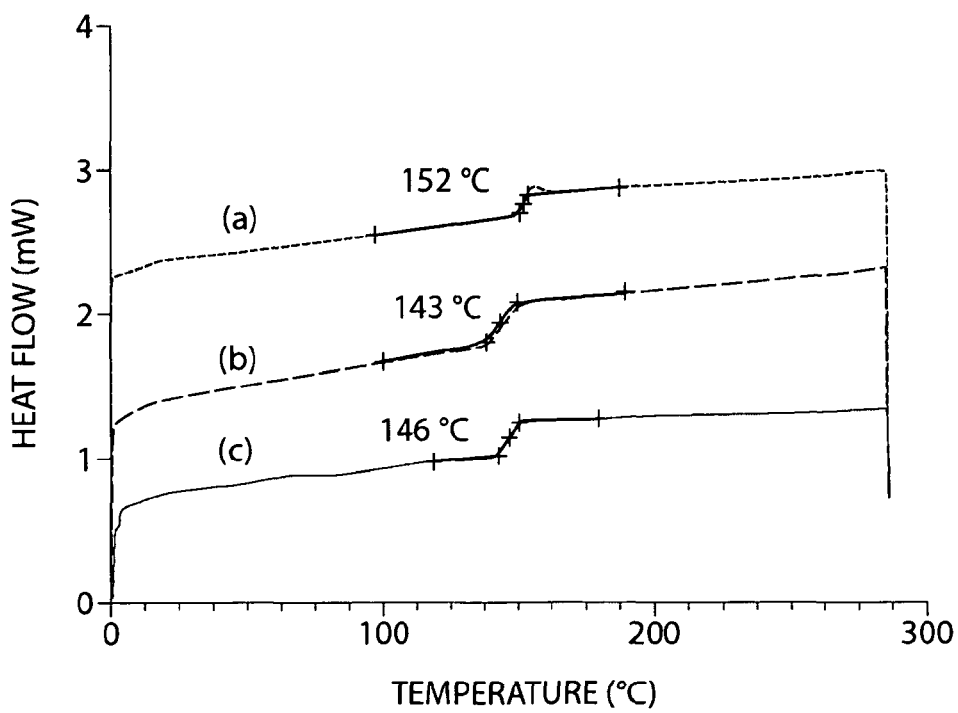
FIG. 7 shows DSC scans of (a) IUP ($2^{nd}$ cycle), (b) 7/93 T/PC ($2^{nd}$ cycle), and (c) Polymer Blend B ($2^{nd}$ cycle) after processing.
Figure 8:
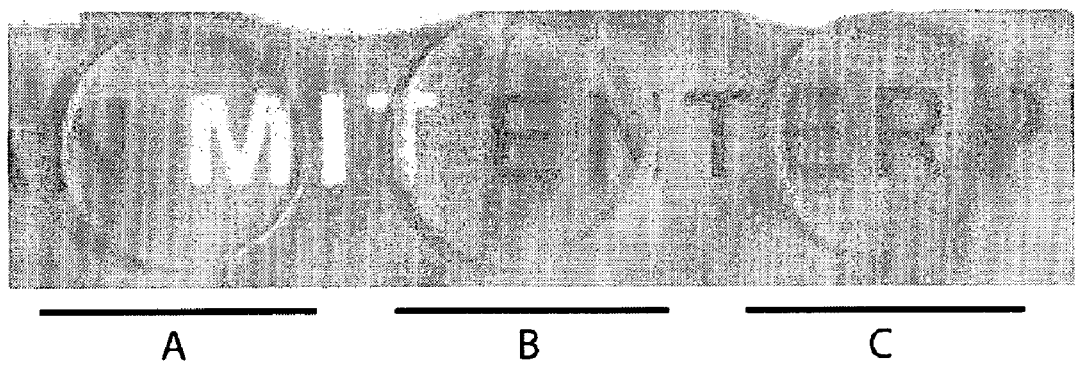
FIG. 8 shows a photograph of polymer samples of IUP, Polymer Blend A, and Polymer Blend B.
Figure 9A:
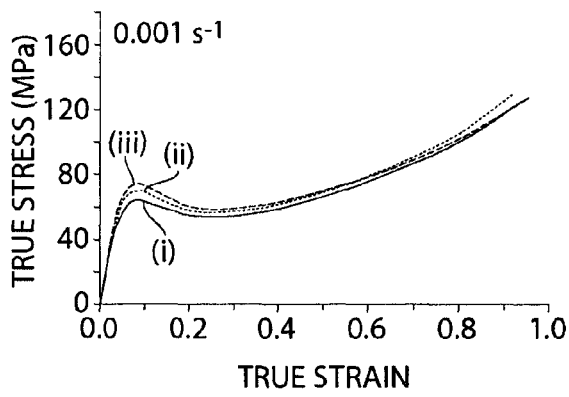
FIG. 9 shows the stress-strain curves comparing (i) IUP, (ii) Polymer Blend A, and (iii) Polymer Blend B from uniaxial compression tests at (a) 0.001 $s^{-1}$, (b) 0.1 $s^{-1}$, (c) 1000 $s^{-1}$, and (d) 2000 $s^{-1}$.
Figure 9B:
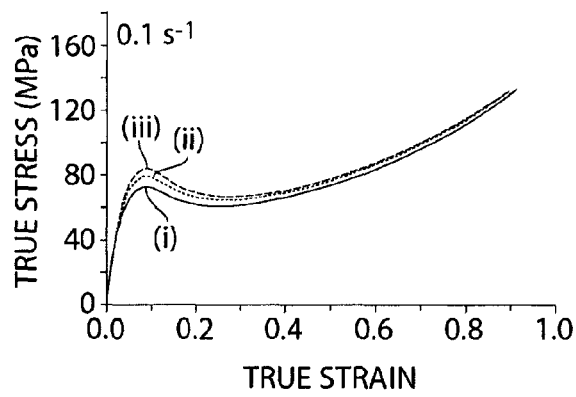
Figure 9C:
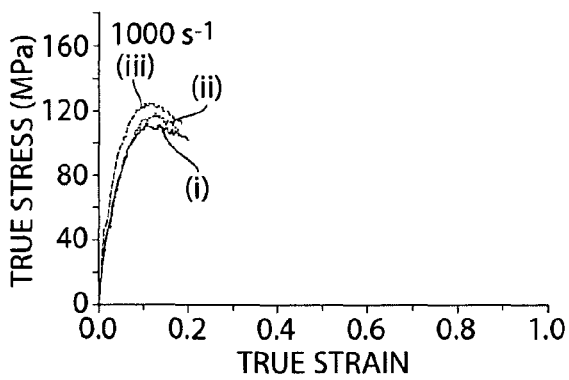
Figure 9D:
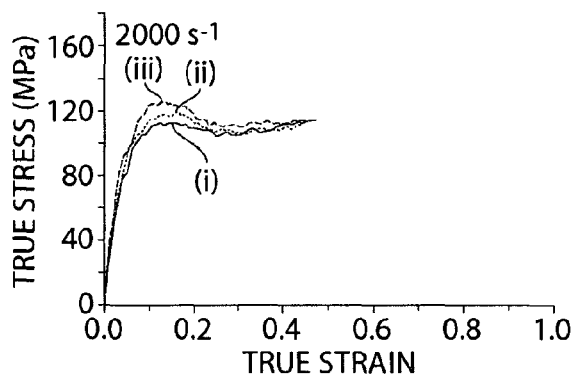

FIG. 6 shows DSC scans of (a) IUP ($2^{nd}$ cycle), (b) 0/100 T/PC ($2^{nd}$ cycle), and (c) Polymer Blend A ($2^{nd}$ cycle) after processing. The $T_g$ values observed are 152° C. for IUP, 140° C. for 0/100 T/PC, and 146° C. for Polymer Blend A. FIG. 7 shows DSC scans of (a) IUP ($2^{nd}$ cycle), (b) 7/93 T/PC ($2^{nd}$ cycle), and (c) Polymer Blend B (2" cycle) after processing. The $T_g$ values observed are 152° C. for IUP, 143° C. for 0/100 T/PC, and 146° C. for Polymer Blend B. Polymers containing a 0/100 T/PC ratio and a 7/93 T/PC ratio exhibited depressed $T_g$ values compared to the high molecular weight commercial IUP, as might be expected from their lower molecular weights. Blending resulted in one visible $T_g$ at 146° C. for both Blends A and B. DSC indicated no signs of crystallinity in the blends, and all polymer samples were optically transparent, as shown by the photograph of polymer samples in FIG. 8. The room temperature densities of IUP, Polymer Blend A, and Polymer Blend B were comparable at 1.19 g/cc, 1.20 g/cc, and 1.20 g/cc, respectively. Entanglement molecular weights were 1920±90, 2100±150, and 2190±210 g/mol for IUP, Polymer Blend A, and Polymer Blend B, respectively.

Example 6

Uniaxial compression tests were conducted for IUP, Polymer Blend A, and Polymer Blend B over a span of six decades in strain rate, ranging from about $10^{-3}$ $s^{-1}$ to 2000 $s^{-1}$. Specimens for all compression tests were of right circular cylinder geometry, with a diameter of approximately 5 mm and a height of 2.5 mm. Low to moderate rate testing ($10^{-3}$ $s^{-1}$ to $10^{-1}$ $s^{-1}$) was conducted on a Zwick/Roell Z010 testing machine at constant engineering strain rates. For lubrication, Thin Teflon® sheets were placed between the Zwick platens and specimen surfaces, and WD-40 was used between the Teflon sheets and platens to minimize friction and obtain homogeneous uniaxial compression conditions.

High strain rate testing (1000 $s^{-1}$ to 2000 $s^{-1}$) was performed on a compressive split-Hopkinson pressure bar (SHPB) test apparatus designed in cooperation with and built by Physics Applications, Inc. of Dayton, Ohio. The apparatus employed solid aluminum pressure bars, both with a length of approximately 2.3 meters and a diameter of 19.05 millimeters. The selected specimen geometry was chosen specifically for these high-rate compression tests, where it has been shown that an aspect ratio of 1:2 (height:diameter) is optimal in negating the effects of longitudinal and radial inertia in the specimen while also minimizing wave attenuation in the strain gage signals. All high-rate specimens were lubricated with a thin layer of petroleum jelly on both faces immediately prior to testing, and little to no barreling was ever observed.

FIG. 9 shows the stress-strain curves comparing (i) IUP, (ii) Polymer Blend A, and (iii) Polymer Blend B from uniaxial compression tests at (a) 0.001 $s^{-1}$, (b) 0.1 $s^{-1}$, (c) 1000 $s^{-1}$, and (d) 2000 $s^{-1}$. At every strain rate measured, the Blend A exhibited a yield strength superior to that of IUP while the yield strength of Blend B was greater still. At the strain rate of 0.001 $s^{-1}$, the stress-strain curve of Blend B began to overlap with that of IUP by a strain level of approximately 75% (true strain). Blend A still exhibited higher stresses even at strains as high as 90%. This was not the case at 0.1 $s^{-1}$, where by about 50% strain, the stress-strain curves of Blends A and B were overlapped and were both slightly higher than IUP. The 0.01 $s^{-1}$ curve (not shown) was an exact intermediary where Blend A still had the highest strength at high strains but by very little over Blend B, which was superior to IUP. Split-hopkinson bar (SHB) was able to achieve much higher strain rates but much lower overall strains. Therefore, the stress-strain behavior at high strains and high strain rates could not be observed. Nonetheless, for each material the general character of the stress-strain curve was observed to be the same at all strain rates, including those obtained from SHB experiments.

Stress-strain curves from uniaxial compression tests comparing IUP, Polymer Blend A, and Polymer Blend B are shown in FIG. 9. It should be noted that the end points of the stress-strain curves correspond to the termination of the particular compression test and not with sample failure. In particular, the maximum strain achieved in the high rate tests (using the SHPB) is linked to the strain rate (due to the nature of applying the load through a pressure bar) where higher maximum strains are obtained for higher rate tests. The compression true stress-strain curves of each material exhibit the classic amorphous polymer behavior of a rate dependent yield stress followed by immediate post-yield strain softening followed by subsequent strain hardening. Interestingly, Polymer Blend A and Polymer Blend B each exhibit a greater amount of post-yield strain softening as compared to the IUP material. After softening, all three materials exhibit similar stress-strain behavior.

Figure 10:
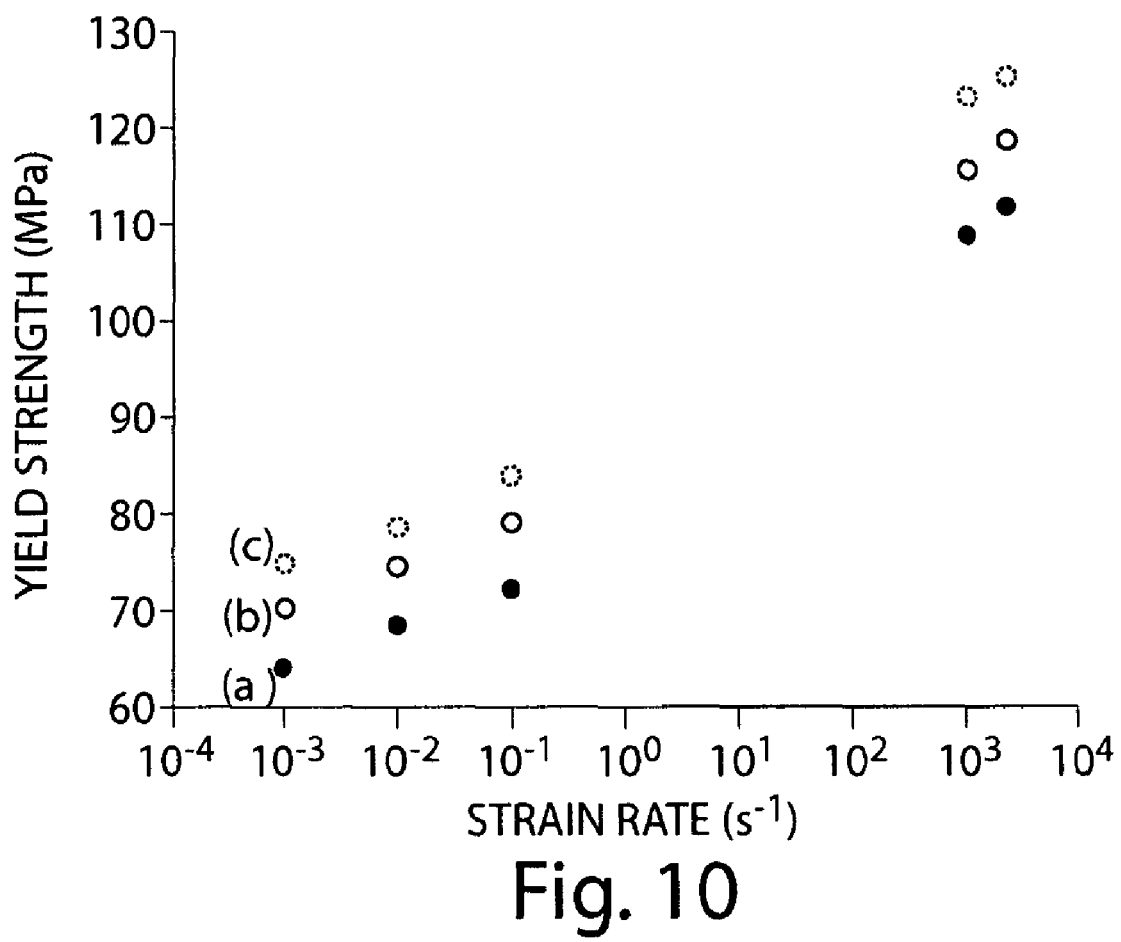
FIG. 10 shows a graph of the strain rate dependence of the yield strengths of (a) IUP, (b) Polymer Blend A, and (c) Polymer Blend B.

Compressive yield stress are summarized in Table 6. IUP, Polymer Blend A, and Polymer Blend B each displayed two distinct regimes of rate-dependent yield behavior, with a significant transition in rate sensitivity occurring over the range of strain rates ($10^0$ $s^{-1}$ to $10^2$ $s^{-1}$) not accessed by either testing instrument. In the high-rate regime (>$10^3$ $s^{-1}$), yield stress was observed to be much more sensitive to changes in strain rate than in the low and moderate rate regime ($10^{-3}$ $s^{-1}$ to $10^{-1}$ $s^{-1}$). This finding was consistent with known results for commercial-grade Lexan® PC. The trend was the same in the novel polymer blends studied here. FIG. 10 shows the strain rate dependence of the yield strengths of (a) IUP, (b) Polymer Blend A, and (c) Polymer Blend B.

At every strain rate measured, Polymer Blend A exhibited a yield strength superior to that of IUP by 6-10%. The yield stress of Polymer Blend B was found to be greater than that of the Polymer Blend A by 5-7% and 12-17% greater than the IUP. It should be noted that a Lexan® PC, tested in a previous study under essentially the same conditions, exhibited higher yield stress values than the IUP. As can be seen in Table 6, Lexan® exhibited values on par with that of the Polymer Blend A, but less than the that of Polymer Blend B.

TABLE 6

Compressive yield strengths at various strain rates. Standard deviations for low strain rates were less than 1 MPa. Standard deviations for high strain rates were about 1 MPa.

| Material | Strain Rate | | | | |
|---|---|---|---|---|---|
| | 0.001 $s^{-1}$ | 0.01 $s^{-1}$ | 0.1 $s^{-1}$ | 1000 $s^{-1}$ | 2000 $s^{-1}$ |
| Lexan* | 70 MPa | 74 MPa | 78 MPa | 112 MPa | 117 MPa |
| IUP | 64 MPa | 68 MPa | 72 MPa | 109 MPa | 112 MPa |
| Blend A | 70 MPa | 74 MPa | 79 MPa | 116 MPa | 119 MPa |
| Blend B | 75 MPa | 79 MPa | 84 MPa | 123 MPa | 125 MPa |

*Data from Lexan ® 9034 PC (please see Mulliken AD, Boyce MC. International Journal of Solids and Structures 2006; 43(5): 1331-1356, incorporated herein by reference).

Example 7

Dynamic mechanical testing in a tensile mode was used to probe the temperature and frequency dependence of the response of the materials to deformation. Dynamic mechanical thermal analysis (DMTA) testing was performed on a TA Instruments Q800 Dynamic Mechanical Analyzer. Rectangular bar specimens (approximately 20 mm×2 mm×1.6 mm) were loaded in the DMTA with a tensile pre-load (0.01 N) and scanned at 2° C./min; displacement control mode was used to oscillate about the pre-strain level such that total strain levels never exceeded 0.1% at temperatures below $T_g$. Materials were tested at frequencies of 1 Hz over the temperature range of −140 to 170° C. IUP and the blends described in Example 5 were then tested at 100 Hz over small ranges in temperature around identified material transitions.

Figure 11:
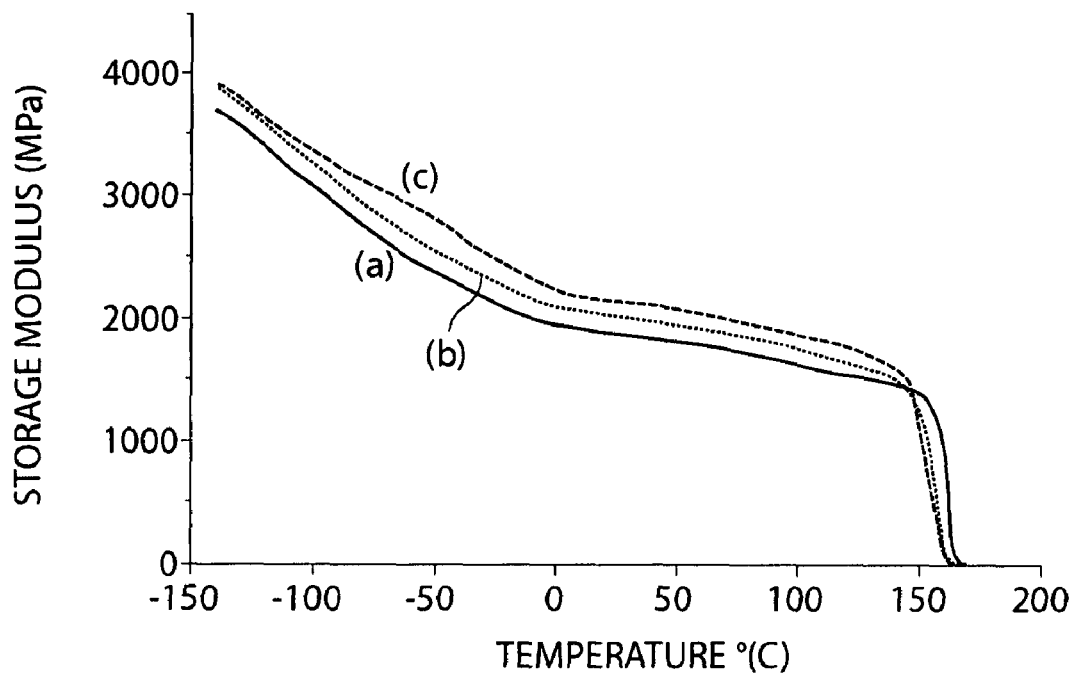
FIG. 11 shows a graph of the storage modulus as a function of temperature for (a) IUP, (b) Polymer Blend A, and (c) Polymer Blend B Curves are at 1 Hz unless labeled otherwise.
Figure 12:
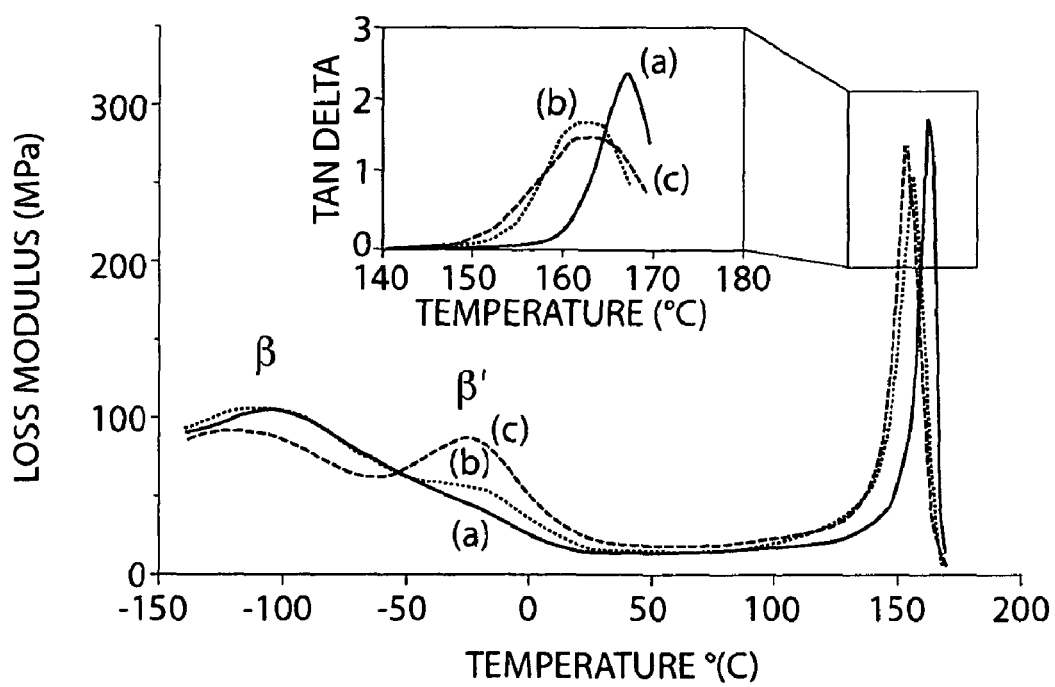
FIG. 12 shows a graph of loss modulus as a function of temperature for (a) IUP, (b) Polymer Blend A, and (c) Polymer Blend B.
Figure 13A:
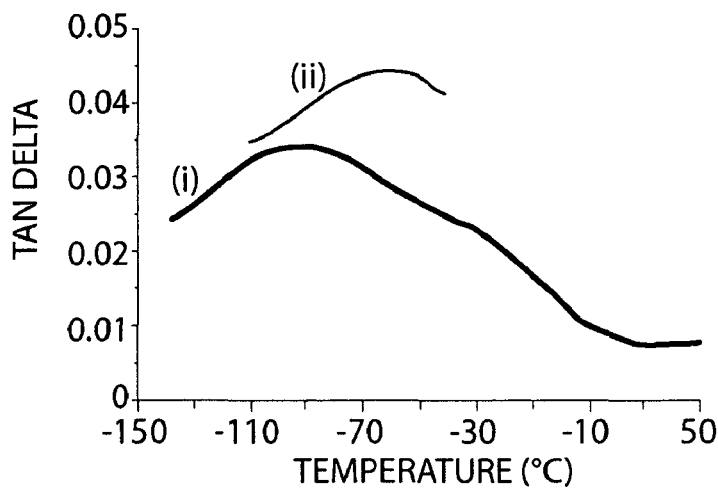
FIG. 13 shows a graph of tan delta value as a function of temperature for (a) IUP, (b) Polymer Blend A, and (c) Polymer Blend B at (i) 1 Hz and (ii) 100 Hz.
Figure 13B:
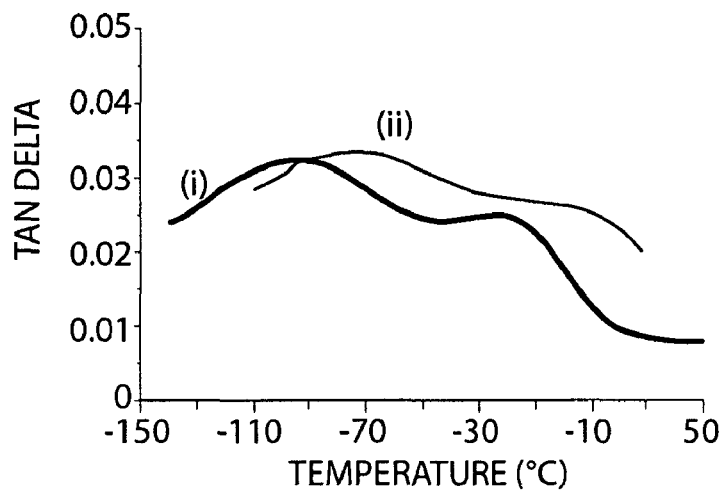
Figure 13C:
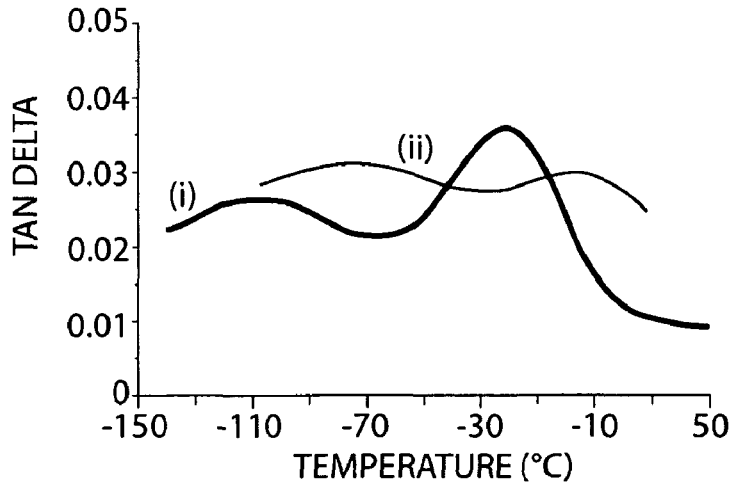

Comparative DMTA results for IUP, Polymer Blend A, and Polymer Blend B are summarized in FIGS. 11-13. FIG. 11 shows the storage modulus as a function of temperature for (a) IUP, (b) Polymer Blend A, and (c) Polymer Blend B Curves are at 1 Hz unless labeled otherwise. FIG. 12 shows the loss modulus as a function of temperature for (a) IUP, (b) Polymer Blend A, and (c) Polymer Blend B. FIG. 13 shows the tan delta value as a function of temperature for (a) IUP, (b) Polymer Blend A, and (c) Polymer Blend B at (i) 1 Hz and (ii) 100 Hz. Curves are at 1 Hz unless labeled otherwise.

In general, the character of the storage modulus curve was the same for all three polymers. Polymer Blends A and B showed a lower glass transition temperature (both≈162° C. from tan delta) compared to IUP (≈167° C. from tan delta), consistent with DSC results. However, despite the lower $T_g$, both blends displayed enhanced stiffness relative to IUP across most temperatures in the glassy regime. At all temperatures above −75° C. and below $T_g$, the Blend A had a storage modulus (G') 5-10% higher than IUP while the modulus of Blend B was 14-20% higher than IUP. The modulus values at room temperature (25° C.) for IUP, Polymer Blend A, and Polymer Blend B were 1.89 GPa, 2.03 GPa, and 2.15 GPa, respectively.

All three materials exhibited a low temperature secondary (β) transition as apparent in the loss modulus as well as noticeable in the rate of increase in the storage modulus below 0° C. For the case of Polymer Blend A, the β-peak was nearly identical to that of IUP, occurring at −103° C. and −108° C. for IUP and Polymer Blend A, respectively, from loss modulus (FIG. 12). For Polymer Blend B, this peak shifted to a lower temperature, −118° C.

A noticeable difference in the loss modulus curves was the emergence of an additional transition at about −20° C. This peak, labeled as β' in FIG. 12, was seen in both Polymer Blend A and Polymer Blend B where its intensity in Polymer Blend B is equivalent to that of the β-peak. Close examination of the data for IUP revealed that Iupilon® PC indeed had a shoulder (barely discernible) in the β' region.

In Lexan®, the β-peak has been reported to shift linearly by 15° C. with each log-scale decade of strain rate from 1 to 100 Hz. An approximate shift in the peak positions per decade was therefore calculated and labeled on the curves in FIG. 13. Movements of the shoulder in IUP were not tracked due to the inability to determine accurately an actual peak position. The β-peak was seen to shift about 16° C./decade in IUP, which is consistent with reported values. In Blend A, the β-peak shifted at a slower rate of 12° C./decade while the β-peak in Blend B shifted at a slightly higher rate of 18° C./decade. The β'-peaks in both blends shifted at comparable rates of 13-14° C./decade.

Example 8

Uniaxial tension tests were performed on dogbone samples for IUP, Polymer Blend A, and Polymer Blend B. The samples were of 17 mm gauge length in the Zwick/Roell Z010 at a constant displacement rate of 5 mm/min. An extensometer applied to measure true strain within the gauge length was found to induce premature brittle failure in the specimens, and thus it was necessary to estimate engineering strain from crosshead displacement. This estimated strain is reported in the figures as "apparent engineering strain." Without an accurate strain measure, modulus values in tension also could not be calculated. Therefore, modulus was reported using the storage modulus value obtained in the DMTA experiments, for a wide range of temperatures.

A TA Instruments Q1000 Differential Scanning Calorimeter (DSC) was used to scan samples at 10° C./min. Density measurements were taken using a Micromeretics AccuPyc 1330 He pycnometer by researchers at DuPont using an average of 10 data points. A TA Instruments Advanced Rheometer 2000 was used on circular disk specimens with the same geometry as used for compression testing. Frequency sweeps from 100 to 0.1 rad/sec and temperature sweeps from 200 down to 160° C. at 10% strain were used to generate master curves through time-temperature superposition. Entanglement molecular weight ($M_e$) was calculated from the measured plateau modulus, which was identified by the minimum in the tan δ vs. frequency curve. Three samples were tested per polymer for all characterization methods unless specifically noted otherwise.

Figure 14:
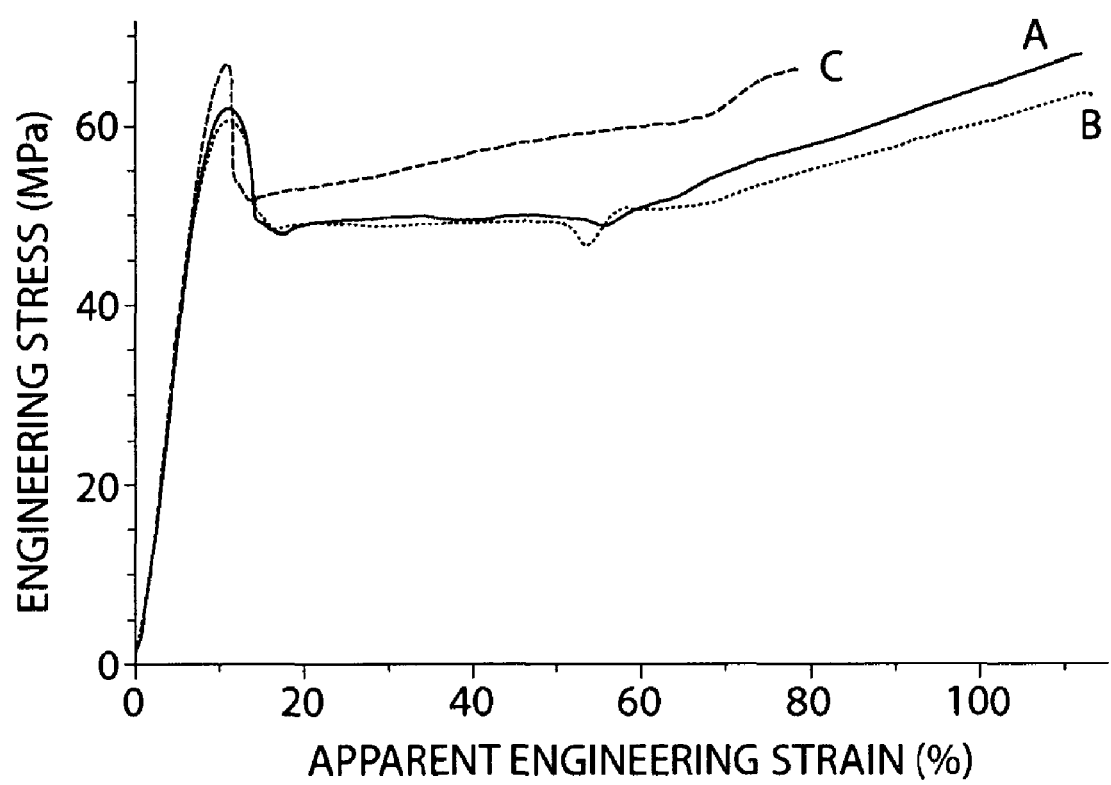
FIG. 14 shows a graph of engineering stress as a function of apparent engineering strain from uniaxial tensile tests conducted on dogbone samples of (a) IUP, (b) Polymer Blend A, and (c) Polymer Blend B.
Figure 15A:
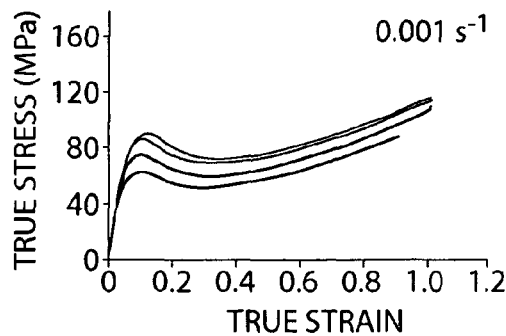
FIG. 15 show the stress strain curves for various polymers at a strain rate of (a) 0.001 s$^{-1}$, (b) 0.01 s$^{-1}$, (c) 0.05 s$^{-1}$, (d) 1000 s$^{-1}$, and (e) 2100 s$^{-1}$.
Figure 15B:
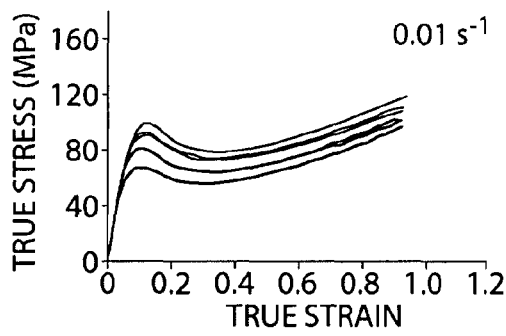
Figure 15C:
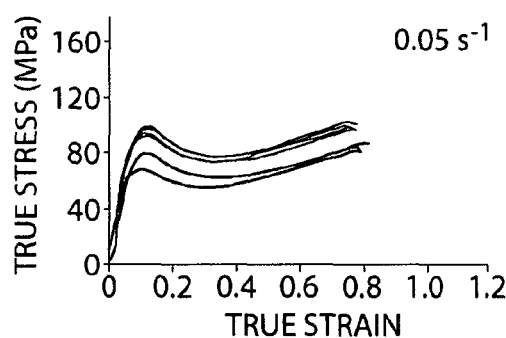
Figure 15D:
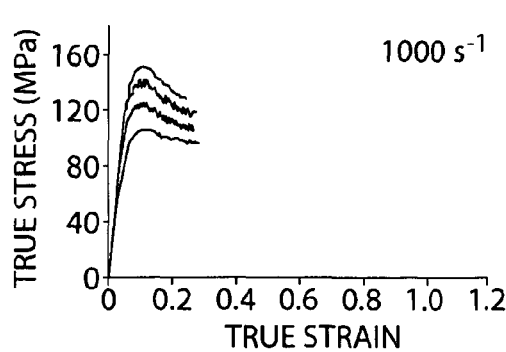
Figure 15E:
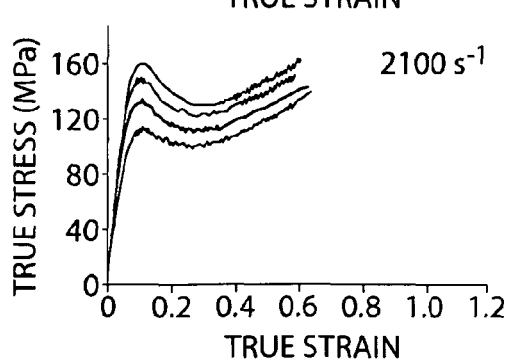

FIG. 14 shows the uniaxial tensile tests conducted on dogbone samples of (a) IUP, (b) Polymer Blend A, and (c) Polymer Blend B, to examine the ductile behavior of the polymers. It was observed that all three samples displayed characteristic ductile cold drawing (including necking, neck stabilization and subsequent neck propagation) with nominal failure strains over 80%. IUP and Polymer Blend A exhibited nearly identical behavior, with Polymer Blend A demonstrating a slightly higher tensile yield stress and slightly lower tensile stress at failure. On the contrary, the Polymer Blend B exhibited a higher tensile yield stress as well as a higher tensile stress during cold drawing. Yield strength values were consistent with trends observed in uniaxial compression tests, with Blend B having the highest yield stress and IUP having the lowest. Post-yield, the stress-strain curve of Polymer Blend A overlapped with that of IUP, exhibiting flat engineering stress levels for about 40% apparent engineering strain (associated with sample drawing) before the samples began to strain harden. During this transition, some irregularity in the stress-strain profile was noticeable as "dips" or "bumps." This corresponded to the neck propagating to the edge of the gauge length and impinging upon the tapered section just before the grip areas of the dogbone samples. This effect was also present in Polymer Blend B but at higher strains and was followed by failure shortly thereafter.

Young's modulus was not obtained from these tensile tests, since cross-head displacement was used to monitor the strain and, in this Example, did not give a good measure at small strains. The strain is reported in FIG. 14 as an "apparent engineering strain" defined as the cross-head displacement divided by the gauge length. Results from the tensile tests are summarized in Table 7 along with the tensile modulus measured from DMTA.

TABLE 7

Tensile mechanical properties, where ρ is the density (standard deviations ≈ 0.01 g/cc), E is Young's modulus from DMA (1 Hz at 25° C.; standard deviations ≈ 0.02 GPa), $\sigma_y$ is the tensile yield strength (standard deviations ≈ 1 MPa), and $\epsilon_b$ is the strain to break, highest value observed.

| Material | ρ (g/cc)[a] | E (GPa)[b] | $\sigma_y$ (MPa)[c] | $\epsilon_b$ (%)[d] |
|---|---|---|---|---|
| IUP | 1.19 | 1.89 | 61 | 110 |
| Blend A | 1.20 | 2.03 | 63 | 110 |
| Blend B | 1.20 | 2.15 | 67 | 80 |

Example 9

Both the DSC and DMTA data indicated that the blending process resulted in homogeneous, amorphous polymer samples. Each blend exhibited a single glass transition, that was an average between the higher $T_g$ from Iupilon® PC and the lower $T_g$ from the lower molecular weight PCs. The density was seen to increase slightly for the blends, but within one standard deviation of the pure Iupilon® PC. Despite these relatively minor differences, the mechanical properties seemed to be very sensitive to composition. Both Polymer Blend A and Polymer Blend B exhibited enhanced values for stiffness and yield strength in both compressive and tensile tests, relative to IUP alone. While the increase in stiffness and yield strength from IUP to Polymer Blend A can be attributed to blend effects, the additional improvements from Polymer Blend A to Polymer Blend B were more likely related to the presence of triptycene units. Enhancements bought about by the presence of triptycene units occurred with only a 1.90 wt % triptycene content.

Previous studies have shown that, when incorporated into a polyester, triptycenes can induce novel steric inter-chain interactions, such as molecular threading and molecular interlocking through the minimization of IMFV, while inhibiting crystallinity. These enhanced lateral interactions can result in higher stiffness and strengths while also improving ductility through an extended sample drawing region believed to be associated with molecular threading. However, in the present study, due to the larger diameter of the bisphenol-A component with pendant methyl side-groups, the PC chain may not thread through triptycene cavities as efficiently as the polymer containing linear aliphatic components. Unlike previous polyester-based systems, minimal or no triptycene-triptycene interlocking region was observed in the high strain data. DMTA data was obtained to build a framework to understand how these chain packing interactions directed the mechanical properties observed.

The compressive yield behavior of many polymers including polycarbonates is often correlated to sub-$T_g$ thermally activated mechanical relaxations that are indicative of accessible deformation modes related to the molecular motions of specific segments of the polymer chain. As shown in FIG. 12, PC-1 exhibited a pronounced β relaxation at approximately −92° C., and the variation of the compressive yield strength of polycarbonates with strain rates is directly related to its β relaxation. Whether the phenyl motions or carbonate motions dominate this relaxation, modifications to the main chain that affect the mobility of either the phenyls or the carbonate groups have been shown to alter the shape and position of this peak. However, it has also been shown that the β relaxation involves intra-chain and inter-chain cooperative motions; and therefore, any local molecular restrictions would have to influence multiple repeat units in order to affect the β relaxation. The blending process did not result in any changes to the β relaxation as the loss modulus curves for IUP and Polymer Blend A were identical around that transition. Therefore, the shift in peak position of the β relaxation for Polymer Blend B may be solely attributed to triptycene interactions. It is possible that the triptycene units function as local inhomogeneities in the chain backbone, which disturb the cooperative motions of the bisphenol-A PC. However, copolymerizations with aromatic groups in as high as 25 mole % that do not chemically alter the phenyls or carbonate groups in the main chain of PC have been shown to leave the β relaxation unaffected. Without wishing to be bound by theory, several explanations for such changes to the β relaxation are described herein. First, the triptycene units might not engage in the types of molecular threading seen in previous polyester studies. Instead, the IMFV associated with each triptycene unit may be left unoccupied, increasing the total free volume in the system. This increase in free volume may afford greater molecular mobility to the PC chain resulting in a lower $T_\beta$ and $T_\alpha$. This would imply that there should be a lower density in the triptycene-containing PC (which however was not observed). $M_e$ data imply a lesser degree of entanglements, but the effects of molecular weight distribution on the data are not well accounted for. Neither an increase in free volume nor samples with low molecular weight (unless below 6-9 units of PC monomer) have been documented to dampen the intensity of the β-peak.

Another possible explanation is that the triptycenes engage in molecular threading with constituents of the PC main chain. Since molecular threading would create localized restrictions, it might be expected that the β relaxation would therefore occur at a higher temperature. However, β was seen to appear at a lower temperature. This may occur for various reasons, described herein. Without wishing to be bound by theory, it has been suggested that the β relaxation consists of two overlapping contributions: a lower temperature peak from carbonate rotation and a higher temperature peak from phenyl rotation. The suppression of one of these mechanisms while leaving the other intact would serve to narrow the peak. Second, the facility of a particular motion may also lower the temperature at which that peak occurs. The data in FIGS. 11-13 may indicate that the phenyl motions were dampened and carbonate motions were facile. This is unlikely to occur from localized free volume enhancements. Furthermore, increasing free volume has been shown to decrease yield strengths in PCs, in contrast to the observations in this Example.

Thus, the presence of increased inter-chain interactions introduced by molecular threading may account for the enhancement of mechanical properties. The data suggest that the triptycene unites interact with the phenyl units and enhanced cooperative motions of the carbonate units. Increased inter-chain interactions would also explain the enhanced yield strengths observed, given the opposite effect expected from the lower $T_g$'s. DMTA revealed that Polymer Blends A and B had an additional peak (β') appearing as a minor shoulder in IUP. This peak, which occurred at about −20° C., showed that blending the lower molecular weight PC with the Iupilon® PC enhanced a minor relaxation. The lower molecular weight PC may have had a shifted β-peak which appeared as a separate peak in the blend. It is also possible that the presence of low molecular weight PC induced additional molecular motions in the high molecular weight PC similar to what is seen in polyester-PC copolymers. In either case, the enhancements to Young's modulus and yield strengths of Polymer Blend A over IUP are accompanied by the emergence of this additional peak. In Polymer Blend B, the β'-peak was even more intense, and the Young's modulus and yield strengths are again increased.

The difference in the stress-strain behavior between tension and compression at large strains may be a result of the differences in the evolution of molecular orientation during uniaxial tension versus that during uniaxial compression. Uniaxial compression resulted in a preferential biaxial chain orientation in a plane perpendicular to the loading axis; whereas, uniaxial tension aligned the polymer chains along the loading direction. Also, the tensile data show that embrittlement, normally associated with the enhancements to modulus and yield strength, did not occur.

Example 10

In the following example, high molecular weight triptycene-polycarbonates were synthesized and prepared as samples for mechanical testing.

Glassware was oven-baked overnight and cooled down to room temperature under inert atmosphere. In a 500 mL three-neck reaction vessel, triptycene hydroquinone and bisphenol-A were added at the desired molar ratios (5:95, 15:85 or 25:75) to 1.08 equivalent (to the total moles of triptycene hydroquinone and bisphenol-A) diphenyl carbonate (54.10 g, 0.25 mol). The reaction vessel was equipped with an overhead mechanical stirrer, a vacuum distillation head, and a gas outlet connected to a bubbler. While stirring, the vessel was evacuated and refilled with argon three times. The reaction mixture was then heated to 190° C. under a slow flow of argon (1-2 bubbles/second) and was kept at that temperature for 0.5 h. Tetramethylammonium hydroxide (50 µL 10 wt % aqueous solution) and sodium hydroxide (9 µL 0.1 wt aqueous solution) were quickly injected into the vessel. After the mixture was stirred at 190° C. for another 0.5 h, the temperature was increased to 220° C. followed by slow decrease of pressure to 200 torr. After the mixture was stirred at 220° C. and 200 torr for 1 h, the temperature was increased to 250° C. and held for 0.5 h. At 250° C., the pressure was stepwise lowered to 150 torr, 100 torr and 15 torr, and kept at each step for 0.5 h. Then, the temperature was increased to 280° C., the pressure was decreased to 2 torr, and the mixture was stirred at this stage for 0.5 h. Finally, full vacuum 0.8 torr) was applied to ensure maximum removal of phenol. When content became unstirrable, it was removed from heating and stirring. The content was cooled to room temperature under full vacuum followed by the addition of 200-300 mL dichloromethane. The solution was filtered through a 25 micron Teflon® filter followed by precipitation to 2 L methanol. The polymer was received as a pale white solid. Gel Permeation Chromatography (GPC) (Hewlett-Packard series 1100 GPC system) indicated there was a single polymer component. The polymer was characterized by $^1$H Nuclear Magnetic Resonance (NMR) (Inova-500 NMR Spectrometer) and the ratio calculated from $^1$H NMR closely matched the feeding ratio. $^1$H NMR (500 MHz, CDCl$_3$) δ: 7.44-7.03 (m, ArH), 5.72 (s, CH), 1.70 (s, CH$_3$).

Disks of about 50 mm in diameter and 3 mm in thickness were compression molded using identical methods as described in the previous section, and the same cylinder and rectangular bar specimens geometries were cut from these disks. Samples were again dried at 55° C. in vacuum for a minimum of one week prior to testing to ensure the removal of water.

Example 11

The following example describes the study of high molecular weight triptycene-substituted polycarbonates.

The positive mechanical properties trends observed for the blends spurred the development of T-PCs with molecular weights comparable to that of commercial PC (Table 5). Three polymers (5/95, 15/85, and 25/75 T-PCs) with increasing triptycene content were prepared for characterization using the identical procedures as the blends in Example 9 (the corresponding wt %'s of triptycene are listed in Table 8). All three T-PC materials were optically transparent. DSC was used to confirm that samples were amorphous through the absence of any sharp crystalline melting peaks and the display of only a single glass transition ($T_g$). Values displayed in Table 4 show that the $T_g$ initially decreased with the addition of approximately 6 wt % triptycene but then increased with additional triptycene content. Density measurements showed a slight increase with triptycene content, and the entanglement molecular weight ($M_e$) as measured by the plateau modulus in melt rheometry also increased by more than a factor of two with triptycene content from 0 wt % to 26 wt %.

mechanical properties of the T-PC copolymers were consistently superior to that of IUP, with enhancements increasing with triptycene content.

Figure 16:
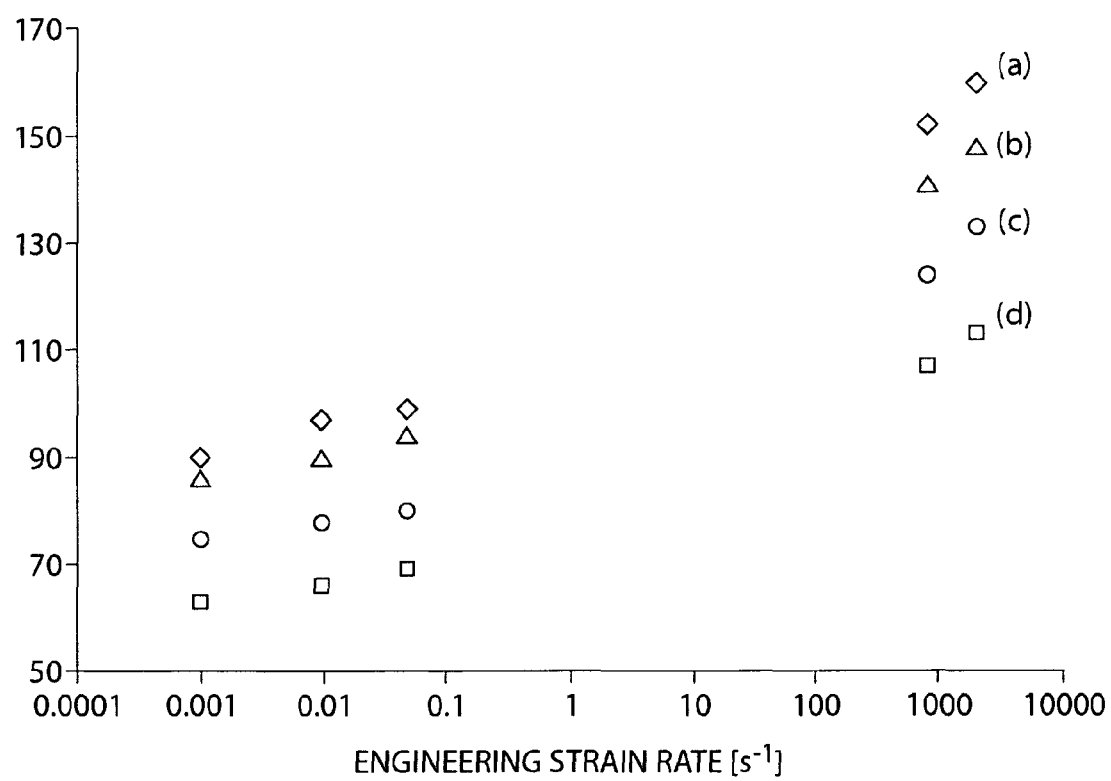
FIG. 16 shows a plot of yield strengths versus strain rates for (a) 25/75 T/PC, (b) 15/85 T/PC, (c) 15/85 T/PC, and (d) IUP.

FIG. 16 shows a plot of yield strengths versus strain rates for (a) 25/75 T/PC, (b) 15/85 T/PC, (c) 5/95 T/PC, and (d) IUP. The rate dependence of the yield strength shifted significantly upon transitioning from low strain rates (0.001 s$^{-1}$ to 0.05 s$^{-1}$) to high strain rates ($\geq$1000 s$^{-1}$). Enhancements to the yield strength with increasing triptycene content were also of greater magnitude at high strain rates, making the percentage improvements approximately constant across all rates of deformation. Yield strengths of 5/95 T/PC, 15/85 T/PC, and 25/75 T/PC were consistently 16-19%, 31-37%, and 42-47% greater than that of IUP, respectively. Yield strains were also seen to increase with triptycene content.

Example 13

The following example describes thermally activated mechanical relaxations conducted for high molecular weight triptycene-substituted polycarbonates.

Figure 17A:
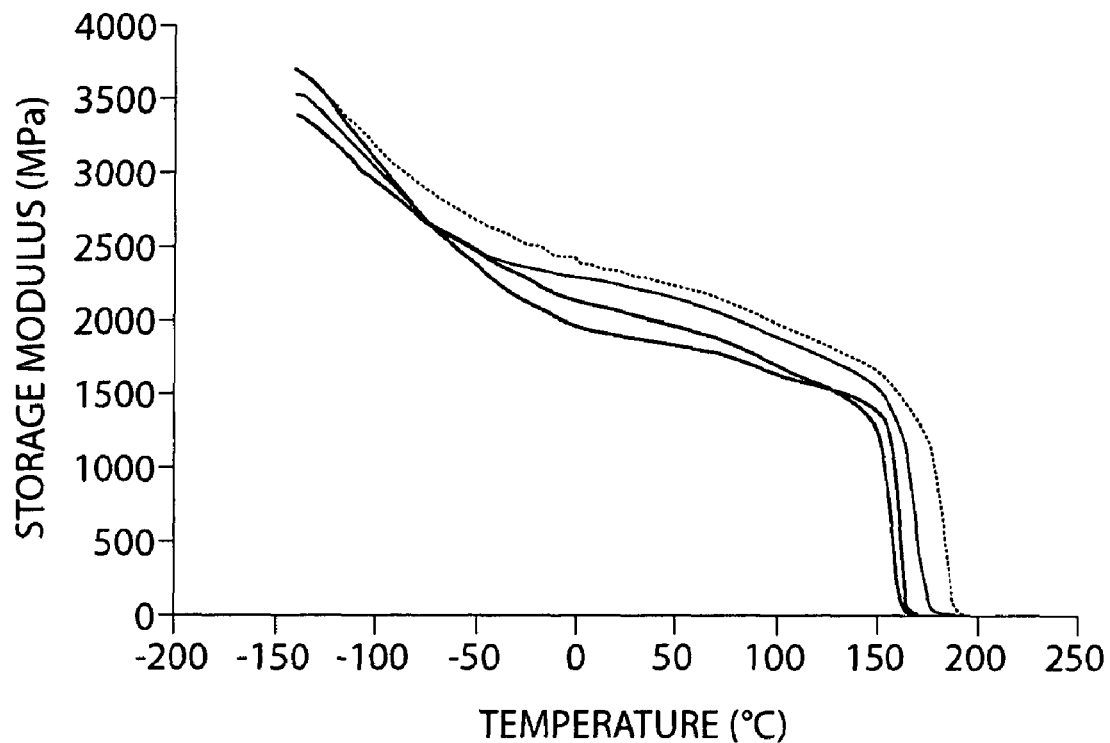
FIG. 17 shows the (a) storage modulus and (b) loss modulus, as a function of temperature, for IUP (solid line), 5/95 T/PC (dark hashed line), 15/85 T/PC (light hashed line), and 25/75 T/PC (dotted line).
Figure 17B:
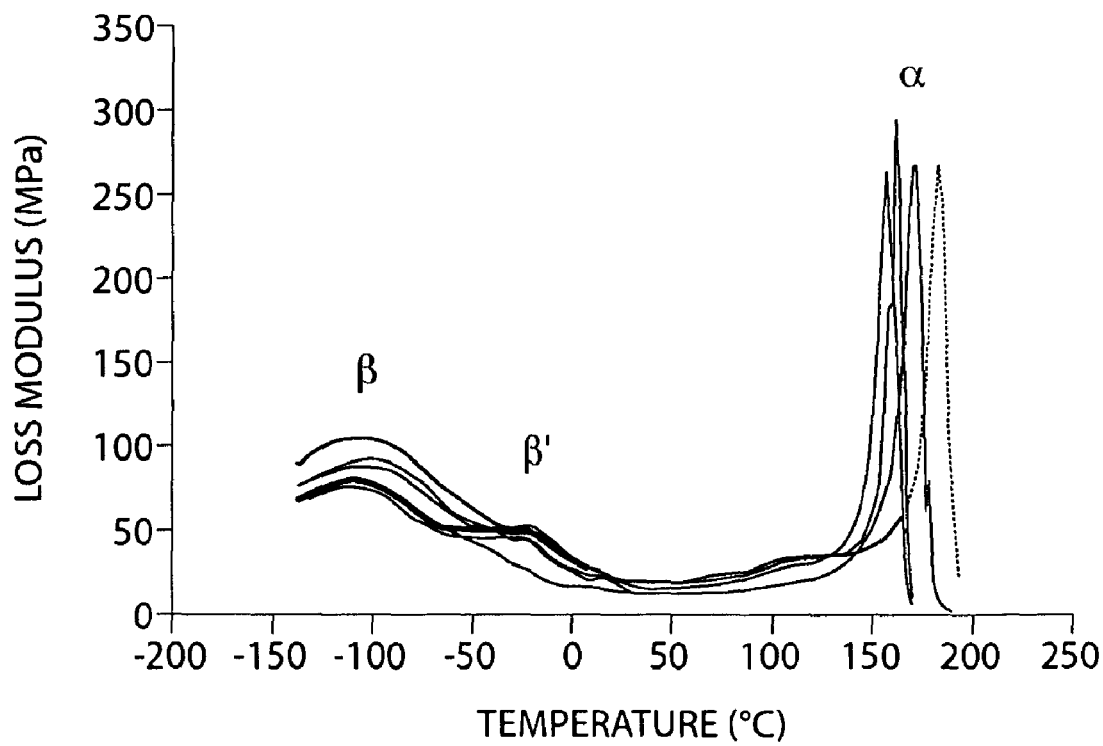

DMTA was conducted to obtain storage modulus and loss modulus data as a function of temperature at 1 Hz. FIG. 17 shows the (a) storage modulus and (b) loss modulus, as a function of temperature, for IUP (solid line), 5/95 T/PC (dark hashed line), 15/85 T/PC (light hashed line), and 25/75 T/PC (dotted line). These curves showed that the room temperature modulus increased systematically with triptycene content (values in Table 8). DMTA confirmed the $T_g$ (labeled the α-transition) behavior observed in DSC. The low temperature

TABLE 8

Structural, thermal, and mechanical properties of a family of IUP and high molecular weight T-PCs. Standard deviations provided in parentheses where appropriate. Standard deviations for all yield strain values were ±1%.

| Sample | | IUP | 5/95 | 15/85 | 25/75 |
|---|---|---|---|---|---|
| Triptycene Content | [wt %] | 0 | 6 | 16 | 26 |
| ρ | [g/cc] | 1.19 (±0.01) | 1.20 (±0.01) | 1.21 (±0.01) | 1.21 (±0.01) |
| $T_g$ [a] | [° C.] | 153/162 | 147/157 | 164/170 | 176/183 |
| $M_e$ | [g/mol] | 1920 (±90) | 2390 (±30) | 3320 (±200) | 4160 (±450) |
| Modulus [b] | [GPa] | 1.89 (±0.01) | 2.06 (±0.02) | 2.23 (±0.01) | 2.33 (±0.01) |
| $\sigma_y/\epsilon_y$ (at 0.001 s$^{-1}$) | [MPa]/[%] | 63 (±1)/10 | 75 (±1)/11 | 86 (±1)/11 | 90 (±1)/13 |
| $\sigma_y/\epsilon_y$ (at 0.01 s$^{-1}$) | [MPa]/[%] | 66 (±1)/11 | 78 (±1)/11 | 90 (±2)/12 | 97 (±1)/13 |
| $\sigma_y/\epsilon_y$ (at 0.05 s$^{-1}$) | [MPa]/[%] | 69 (±1)/10 | 80 (±1)/12 | 94 (±1)/12 | 99 (±1)/14 |
| $\sigma_y/\epsilon_y$ (at 1000 s$^{-1}$) | [MPa]/[%] | 107 (±1)/12 | 124 (±1)/11 | 141 (±2)/11 | 152 (±1)/12 |
| $\sigma_y/\epsilon_y$ (at 2100 s$^{-1}$) | [MPa]/[%] | 113 (±1)/12 | 133 (±1)/11 | 148 (±2)/12 | 160 (±1)/12 |

[a] $T_g$ values measured from both differential scanning calorimetry and dynamic mechanical analysis loss modulus curves presented as DSC/DMTA in the table.
[b] Tensile modulus measured from DMTA storage modulus curves at 25° C.

Example 12

The following example describes the compression testing of high molecular weight triptycene-substituted polycarbonates.

Uniaxial compression testing was conducted on specimens of circular disk geometries. FIG. 15 show the stress strain curves for various polymers at a strain rate of (a) 0.001 s$^{-1}$, (b) 0.01 s$^{-1}$, (c) 0.05 s$^{-1}$, (d) 1000 s$^{-1}$, and (e) 2100 s$^{-1}$. In FIG. 15, various PC and T-PC polymers are shown, including IUP (solid line), 5/95 T/PC (dark hashed line), 15/85 T/PC (light hashed line), and 25/75 T/PC (dotted line). The end points of the stress-strain curves correspond with the termination of the particular compression test and not with sample failure. At all strain rates, the stress-strain curves of all T-PC polymers displayed the same characteristic behavior as IUP, and the storage modulus data was tied directly to the low temperature thermal-mechanical transitions visible in the loss modulus data. In the IUP, the prominent β-transition peak occurred at about −103° C. This peak shifted to −109° C. for the 5/95 T-PC. The β-transition did not shift consistently with increasing triptycene content as the peaks for 15/85 and 25/75 T/PCs were located at −95° C. and −101° C., respectively. In the 5/95 T/PC, an additional peak arose between the well documented α- and β-transitions. This transition is labeled β' in FIG. 17 and occurred around −24° C. This β'-peak was not readily visible in either the IUP or 15/85 T/PC polymers. However, it reemerged in the 25/75 T/PC at about −21° C., although with less intensity than in the 5/95 T/PC sample.

All three, higher molecular weight, higher triptycene content T-PC materials were amorphous and transparent. The decrease in the glass transition temperature for the 5/95 T/PC was not consistent with the triptycene-copolyester trends or the higher triptycene content T/PCs. The $M_e$ measurements showed that the entanglement molecular weight increased strongly with triptycene content (by a factor of 2 over PC for the 25/75 T/PC). It is possible that initially at 6 wt % triptycene the alteration of the chain packing (by the triptycene units) was not compensated by the loss of chain mobility (from molecular threading) accompanied by only 6 wt % triptycene content resulting in a net lowering of the glass transition. However, at higher triptycene content, the lateral interactions and restricted chain mobilities from the triptycene groups more than compensated over the increase in $M_e$ so the $T_g$ increased significantly (to 176° C. for the 25/75 T/PC).

The β-transition peak initially shifted towards lower temperatures with increasing triptycene content but then shifted in the opposite direction, appearing to be progressively approaching the original position of β in the PC homopolymer. It has been suggested that bisphenol-A PC requires approximately 6-9 connected repeat units to express its β-transition, which involves both inter-chain and intra-chain cooperative motions. Based on the assumption of random copolymerization, the average number of PC repeats between T-PC units for 5/95, 15/85, and 25/75 is 19, 5-6, and 3, respectively. Since the 25/75 T/PC is well below the required 6-9 units of uninterrupted bisphenol-A PC repeat units, the β-transition should have been mostly eliminated. Without wishing to be bound by theory, some possible explanations for why it remained significant include i) single triptycene-containing blocks may still exhibit a β-transition, or, ii) through the inter-chain interactions brought on by the minimization of IMFV about the triptycene units, the cooperative motions of the bisphenol-A PC blocks may be enhanced. Additionally, the emergence of the salient new transition (β'), as also seen in the blends) appeared in the 5/95 T-PC, indicating the possibility of unique behavior in these samples. Without wishing to be bound by theory, this may represent some sort of "optimization" of the molecular motions responsible for the relaxation spectra.

The higher triptycene content in high molecular weight T-PCs resulted in enhanced mechanical properties. The modulus, compressive yield strength, and compressive yield strain all increased. The modulus increased approximately on par With triptycene content, but the yield strengths displayed outsized percentage enhancements relative to the triptycene weight percent (in some cases, as high as two to three times). The benefits were nonlinear and seemed to decrease with increasing triptycene content. The increase in compressive yield strain indicated possible enhancements to ductility.

The Examples described herein illustrate the influence on mechanical behavior brought about by the incorporation of triptycene units into a known commercial thermoplastic, polycarbonate. A 25 wt % blend of a 7.7 wt % triptycene-containing PC was found to enhance the stiffness of a commercial Iupilon® PC at all temperatures. Blends of the triptycene-containing PC enhanced the compressive yield strength of the Iupilon® PC by as much as 17%. Loss modulus data revealed that the PC β-transition was altered by blending in the 7/93 T-PC polymer, creating two distinct low-temperature loss peaks (β and β') where there had only been one in the Iupilon® PC homopolymer. The triptycene-containing PC blend was optically transparent, amorphous, and showed no evidence of phase separation. There were notable differences in the stress-strain responses in compression versus tension. Tensile data indicated that the molecular threading in the triptycene-containing PC blend was less efficient than in the triptycene-containing polyesters studied previously. This, combined with the relatively low molecular weight and low concentration of triptycene units (1.9 wt % overall), resulted in essentially no detectable region of molecular interlocking in the tensile stress-strain measurements. High molecular weight, well entangled, higher triptycene content copolymers (26 wt %) also exhibited improved mechanical properties. The improvement of the compressive yield strengths of T-PCs over homopolymer PC by as much as 40% at both low strain rates and high strain rates indicates that these triptycene-enhanced PCs may offer advantageous materials for use in light weight, high impact resistance applications.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:
1. A composition, comprising:
a polymer comprising a shape-persistent portion, wherein the shape-persistent portion has a molecular weight of at least 15 g/mol, and at least one sulfone or urethane group,
wherein the polymer has a mechanical strength at least 5% greater than the mechanical strength of an essentially identical polymer lacking the shape-persistent portion, under essentially identical conditions.
2. A composition as in claim 1, wherein the polymer is a polysulfone or polyurethane.
3. A composition as in claim 1, wherein the shape-persistent portion comprises an iptycene.
4. A composition as in claim 1, wherein the polymer comprises at least 1 wt % of the shape-persistent portion.
5. A composition as in claim 1, wherein the polymer has a mechanical strength at least 10% greater than the mechanical strength of an essentially identical polymer lacking the shape-persistent portion, under essentially identical conditions.

6. A composition as in claim 1, wherein the polymer comprises the structure,

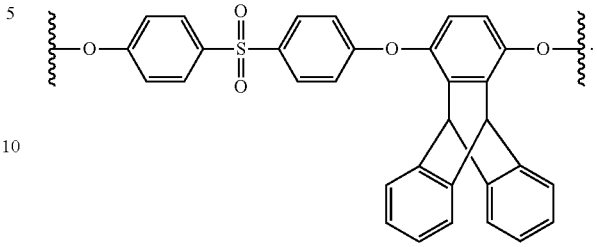

7. A composition as in claim 1, wherein the polymer is a component of a polymer blend.
8. A composition as in claim 7, wherein the polymer blend further comprises a polycarbonate, polysulfone, or polyurethane.
9. A composition, comprising:
a polysulfone or polyurethane comprising a shape-persistent portion, wherein the shape-persistent portion has a molecular weight of at least 15 g/mol and the polysulfone or polyurethane comprises at least 1 wt % of the shape-persistent portion,
wherein the polysulfone or polyurethane has a mechanical strength at least 5% greater than a mechanical strength of an essentially identical polysulfone or polyurethane, respectively, lacking the shape-persistent molecule, under essentially identical conditions.
10. A composition as in claim 9, wherein the shape-persistent portion comprises an iptycene.
11. A composition as in claim 9, wherein the polymer comprises at least 5 wt % of the shape-persistent portion.
12. A composition as in claim 9, wherein the polysulfone or polyurethane has a mechanical strength at least 10% greater than the mechanical strength of an essentially identical polysulfone or polyurethane, respectively lacking the shape-persistent portion, under essentially identical conditions.
13. A composition as in claim 9, wherein the polymer is a component of a polymer blend.
14. A composition as in claim 13, wherein the polymer blend further comprises a polycarbonate, polysulfone, or polyurethane.
15. A composition, comprising:
a polymer comprising the structure,

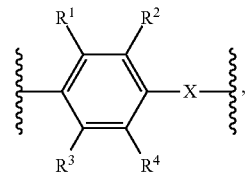

wherein X comprises a sulfone, or urethane; $R^1$ and $R^2$ can be the same or different and are hydrogen, alkyl, heteroalkyl, aryl, heteroaryl, or acyl, optionally substituted, or, $R^1$ and $R^2$ are joined together to form a bicyclic ring system having aromatic or non-aromatic groups, optionally substituted; and, $R^3$ and $R^4$ are joined together to form a bicyclic ring system having aromatic or non-aromatic groups, optionally substituted.

16. A composition as in claim 15, wherein the polymer comprises the structure,

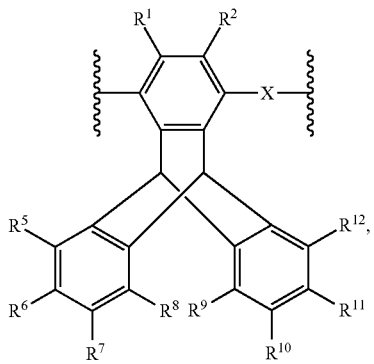

wherein each $R^5$-$R^{12}$ can be the same or different and is hydrogen, alkyl, heteroalkyl, aryl, heteroaryl, or acyl, optionally substituted.

17. A composition as in claim 15, wherein the polymer comprises the structure,

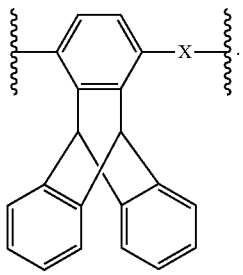

18. A composition as in claim 15, wherein the polymer comprises the structure,

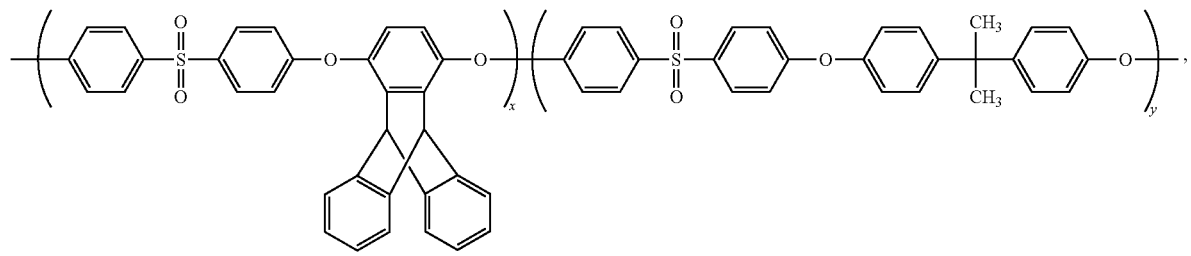

wherein x and y are at least 1.

19. A composition as in claim 15, wherein the polymer comprises the structure,

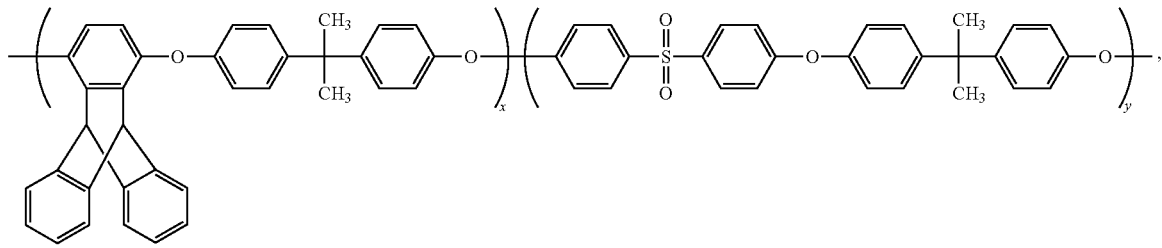

wherein x and y are at least 1.

20. A composition as in claim 15, wherein the polymer comprises the structure,

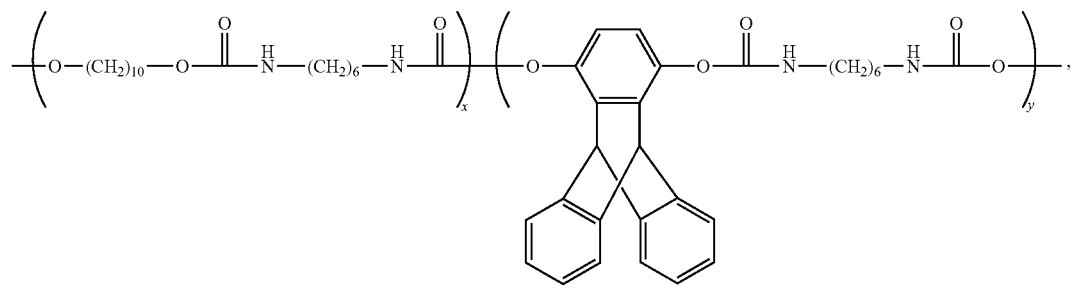

wherein x and y are at least 1.

21. A composition as in claim 1, wherein the polymer comprises the structure,
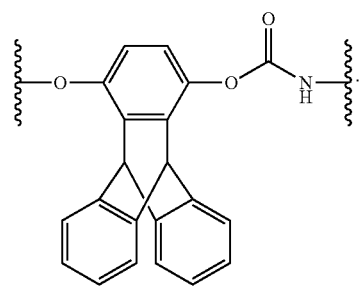
* * * * *